(12) United States Patent
Van Buskirk et al.

(10) Patent No.: US 9,527,367 B2
(45) Date of Patent: Dec. 27, 2016

(54) PNEUMATIC ACTUATORS

(71) Applicant: L & B Manufacturing, Inc., Brownsdale, MN (US)

(72) Inventors: Loyd C. Van Buskirk, Brownsdale, MN (US); Brian R. Meldahl, Brownsdale, MN (US); Dylan C. Van Buskirk, Brownsdale, MN (US)

(73) Assignee: L & B MANUFACTURING, INC., Brownsdale, MN (US)

( * ) Notice: Subject to any disclaimer, the term of this patent is extended or adjusted under 35 U.S.C. 154(b) by 423 days.

(21) Appl. No.: 14/251,837

(22) Filed: Apr. 14, 2014

(65) Prior Publication Data
US 2015/0292635 A1    Oct. 15, 2015

(51) Int. Cl.
*F15B 15/20* (2006.01)
*B60G 17/052* (2006.01)
*B60G 11/27* (2006.01)

(52) U.S. Cl.
CPC .......... *B60G 17/0525* (2013.01); *B60G 11/27* (2013.01); *B60G 2202/412* (2013.01)

(58) Field of Classification Search
CPC .............. F15B 15/10; B66F 3/35; B66F 3/40; B60G 17/0521; B60G 17/0525; B60G 17/0528
See application file for complete search history.

(56) References Cited

U.S. PATENT DOCUMENTS

| 3,565,398 A * | 2/1971 | Floria ............. F15B 15/10 92/35 |
| 5,035,312 A | 7/1991 | Asayama et al. |
| 5,640,987 A | 6/1997 | Sturman et al. |
| 6,231,077 B1 | 5/2001 | Karolek et al. |
| 6,474,353 B1 | 11/2002 | Sturman et al. |
| 8,534,373 B2 | 9/2013 | Van Buskirk et al. |
| 2009/0159143 A1 | 6/2009 | Nishikawa et al. |

FOREIGN PATENT DOCUMENTS

| DE | WO2005049346 | 6/2005 |
| DE | EP2540537 A1 | 1/2013 |
| EP | 0284736 | 8/1990 |
| EP | 2560915 B1 | 2/2013 |
| WO | WO 91/11642 | 8/1991 |

OTHER PUBLICATIONS

International Search Report and Written Opinion, Apr. 1, 2015.

* cited by examiner

*Primary Examiner* — Michael Leslie
(74) *Attorney, Agent, or Firm* — Nikolai & Mersereau, P.A.; C. G. Mersereau

(57) ABSTRACT

A pneumatic actuator unit concept is disclosed which includes a unitary structure that has single or dual inflatable pneumatic air chambers mounted on and fixed to a common central base member or plate member that provides a base for the air chambers. Dual air chambers can apply force in different directions with respect to the base member. The operating air is supplied by way of access ports located in the central base member which also includes an integral internal control valve system. The air chambers are preferably airbag devices which may be sleeve-type airbags, single or multiple convoluted airbags or other inflatable apparatuses.

19 Claims, 26 Drawing Sheets

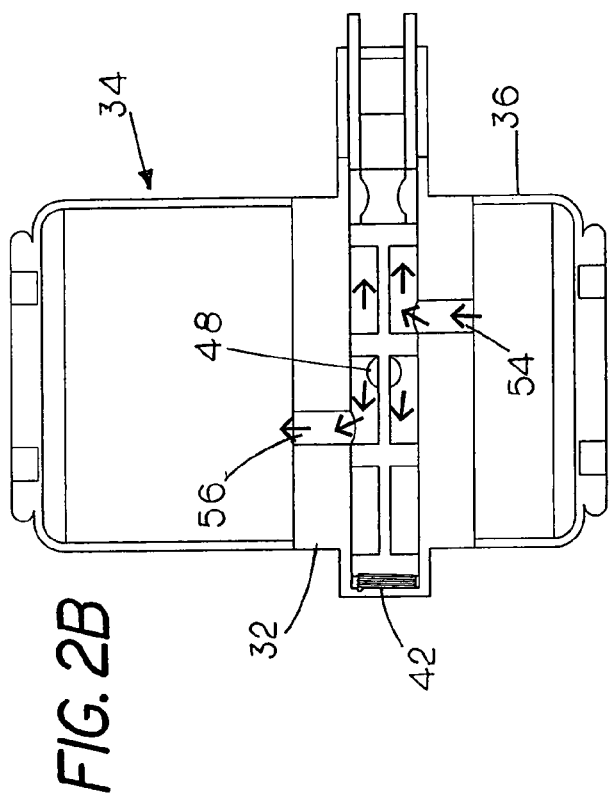
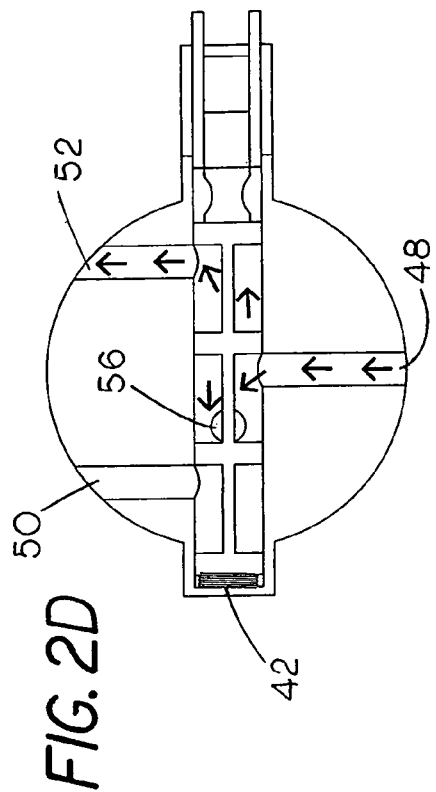
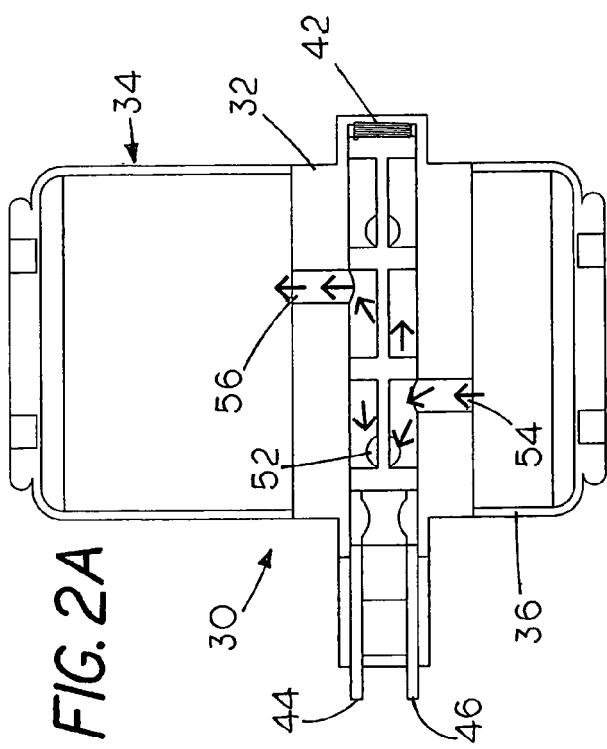
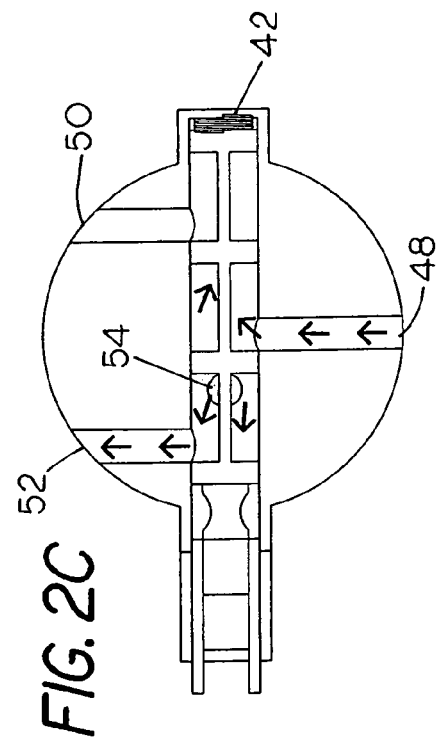

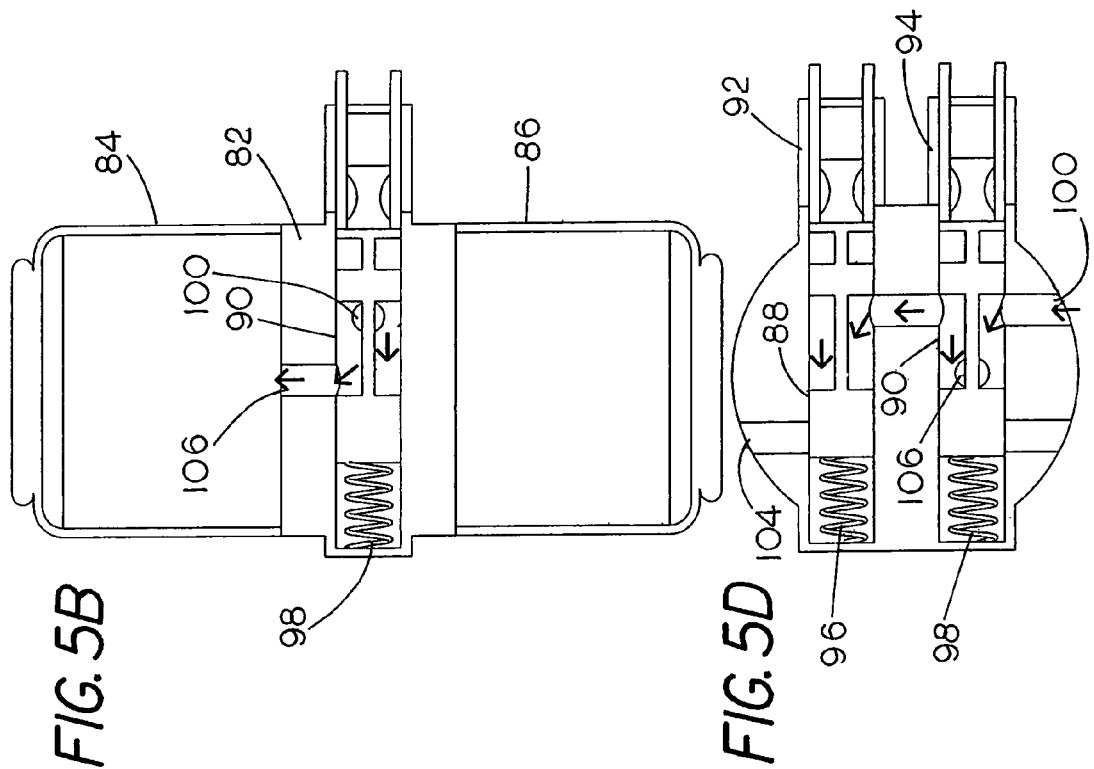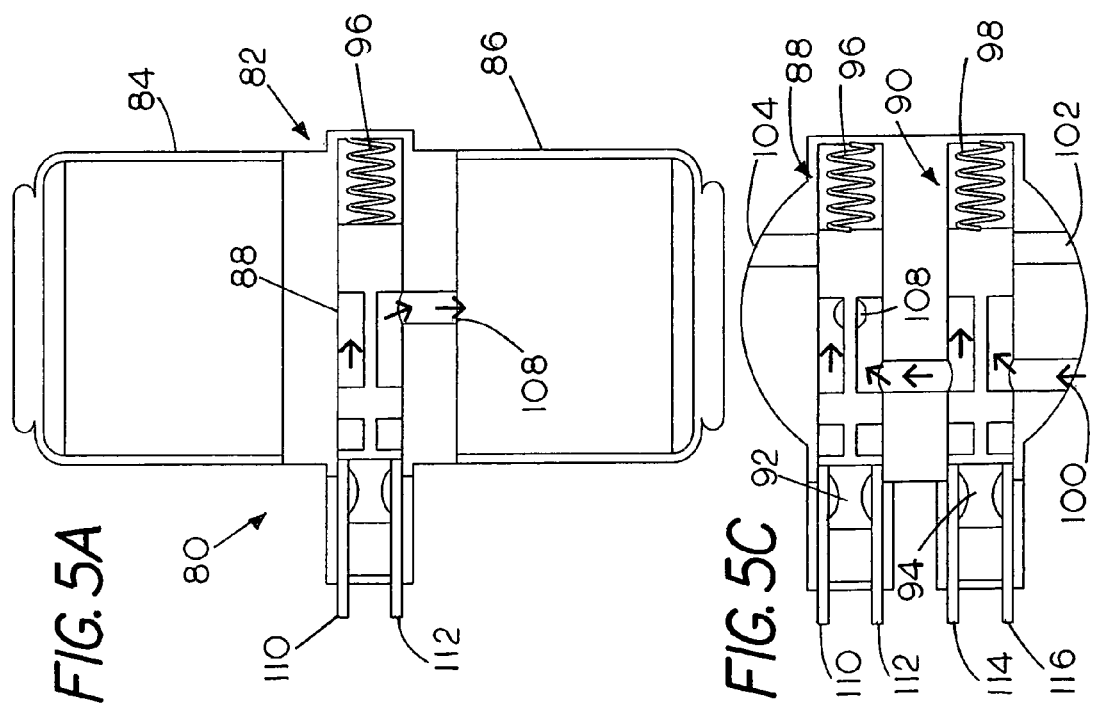

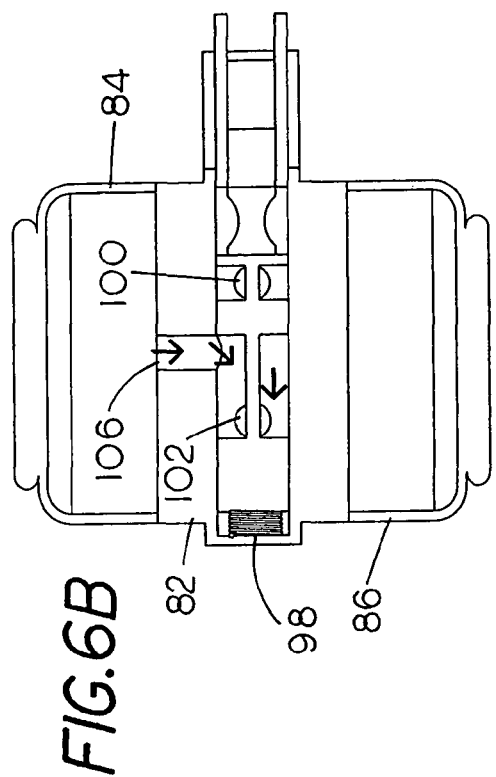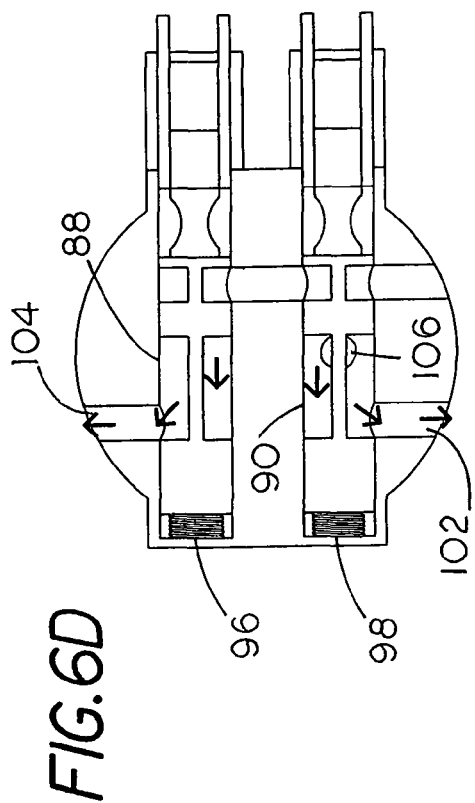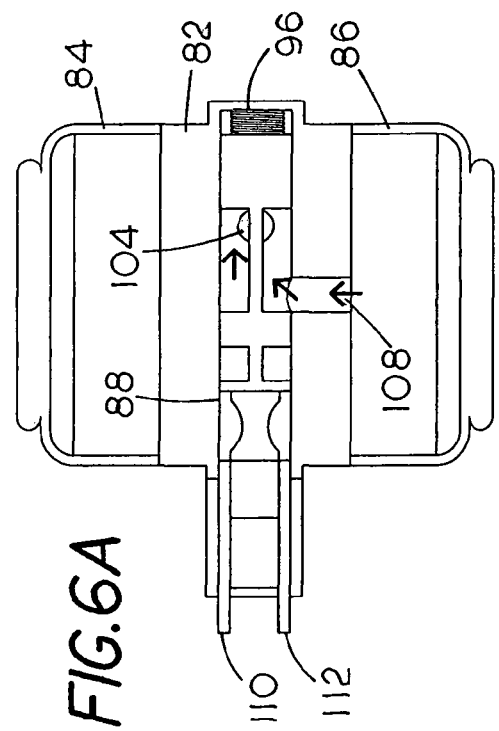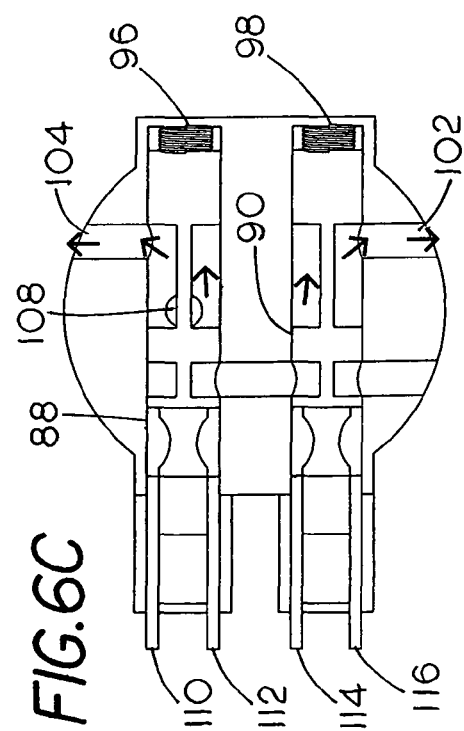

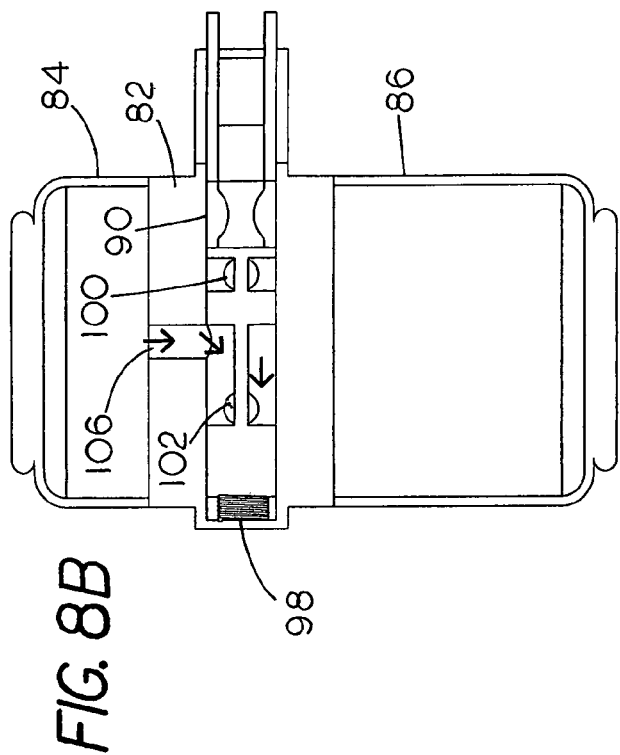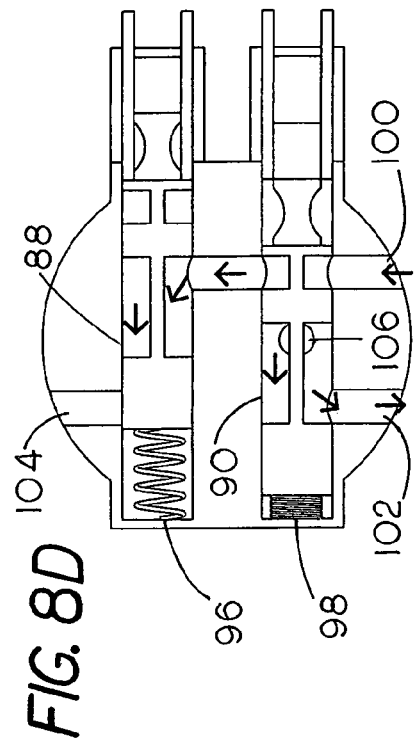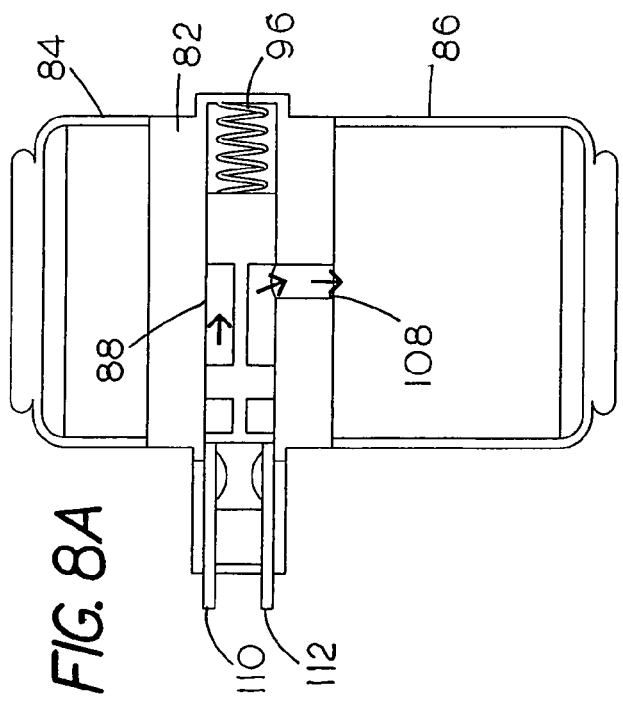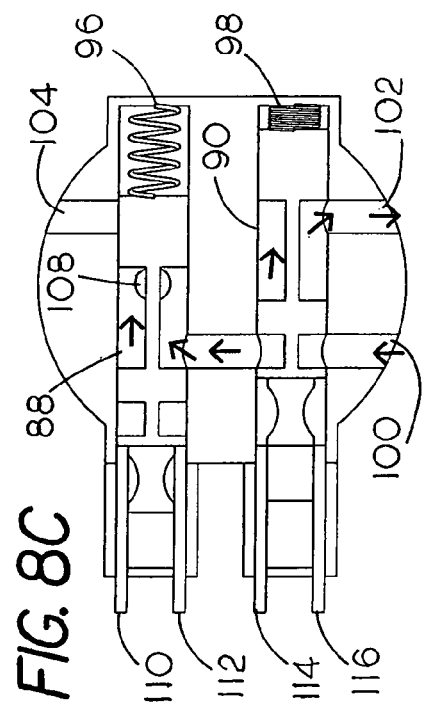

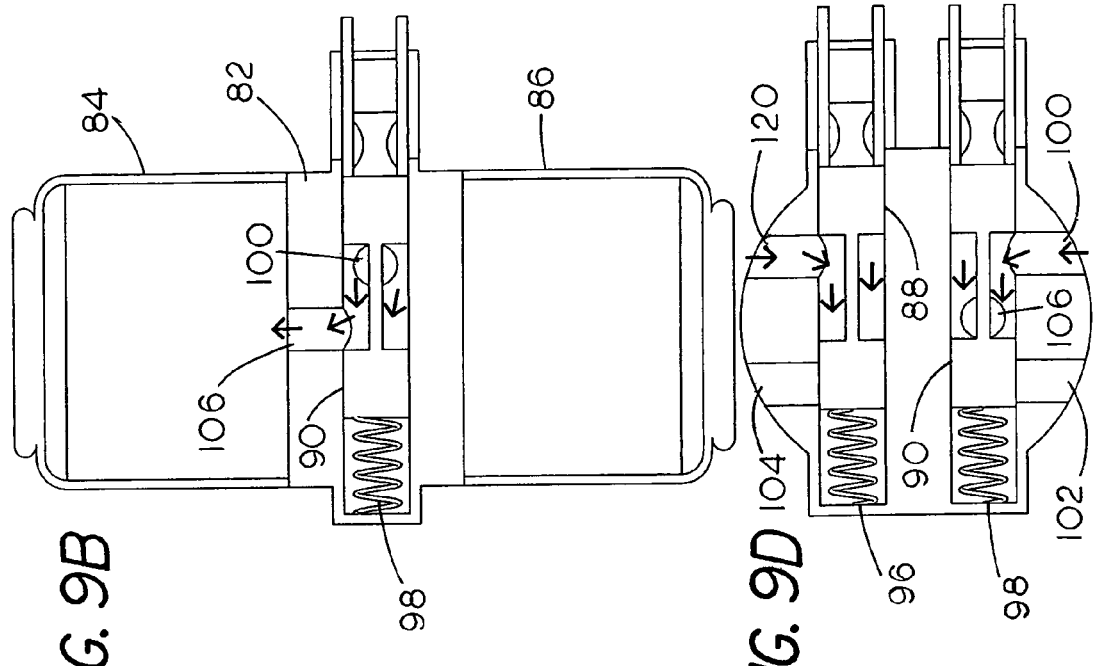
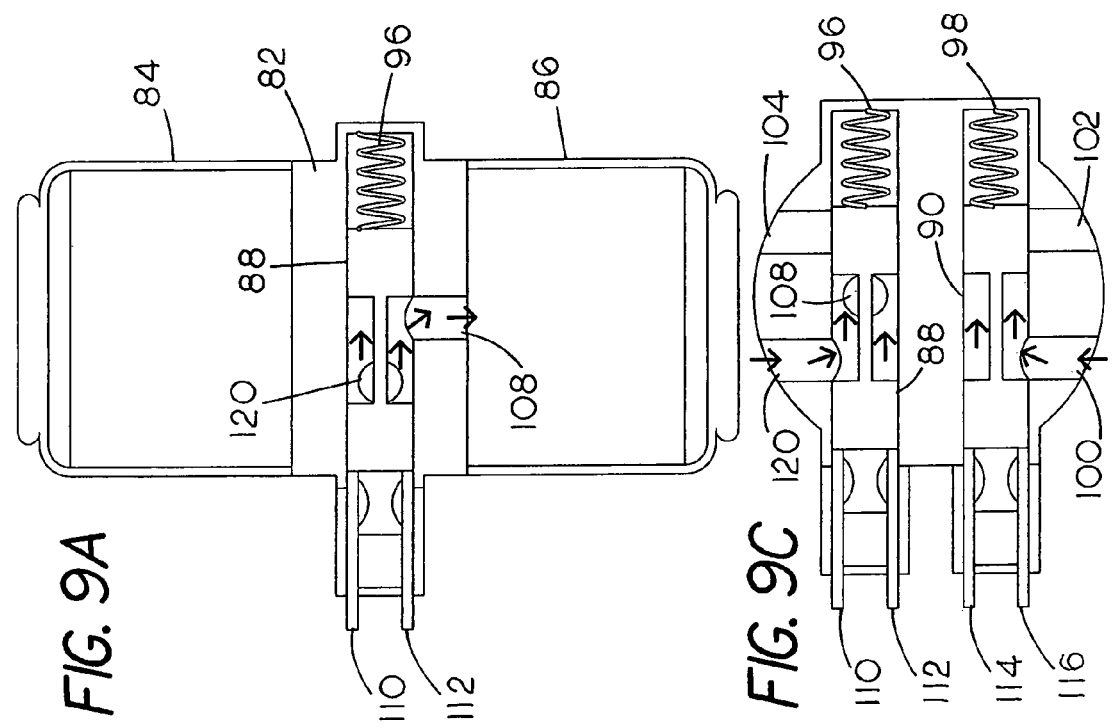

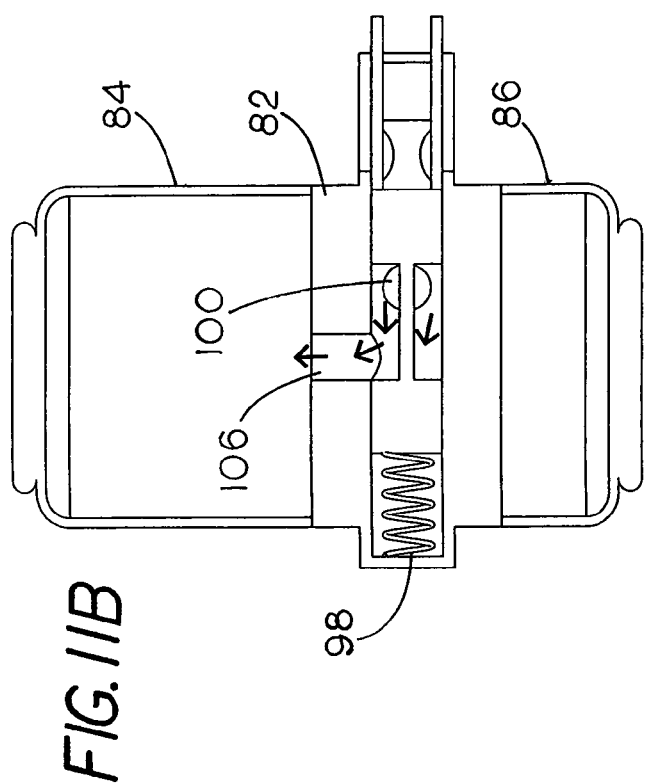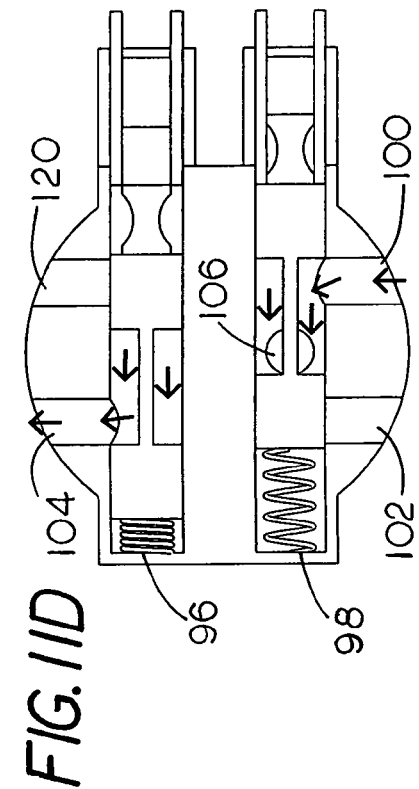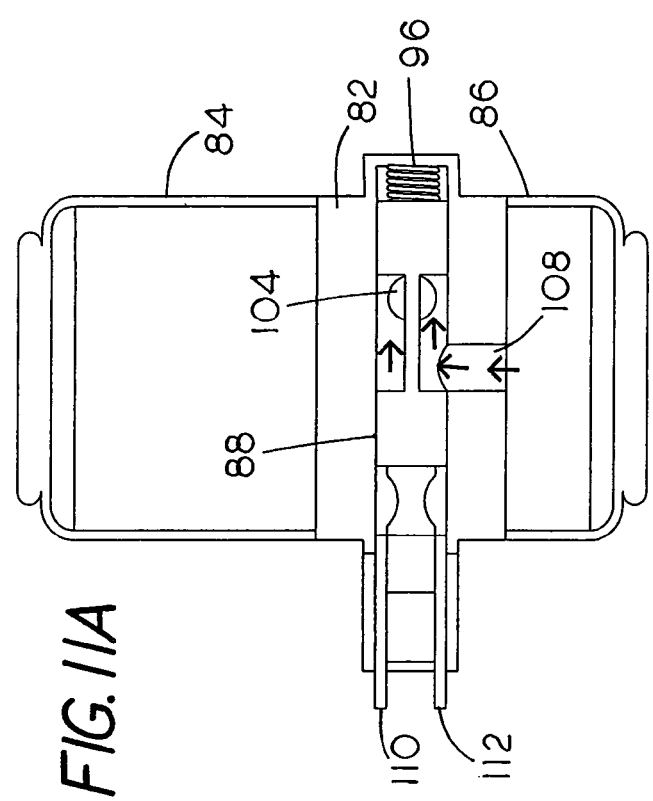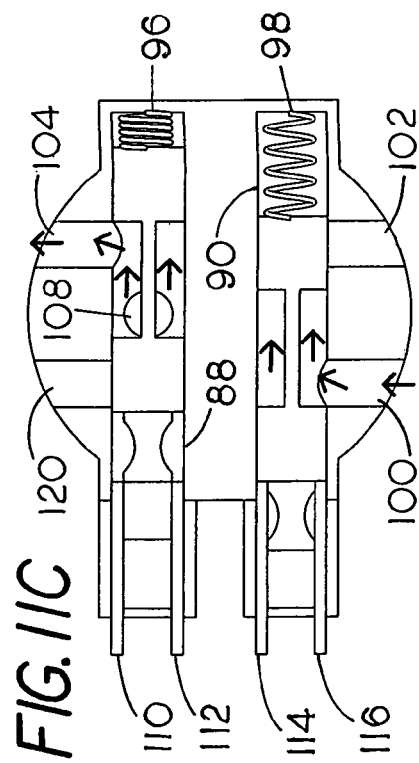
FIG.11A
FIG.11B
FIG.11C
FIG.11D

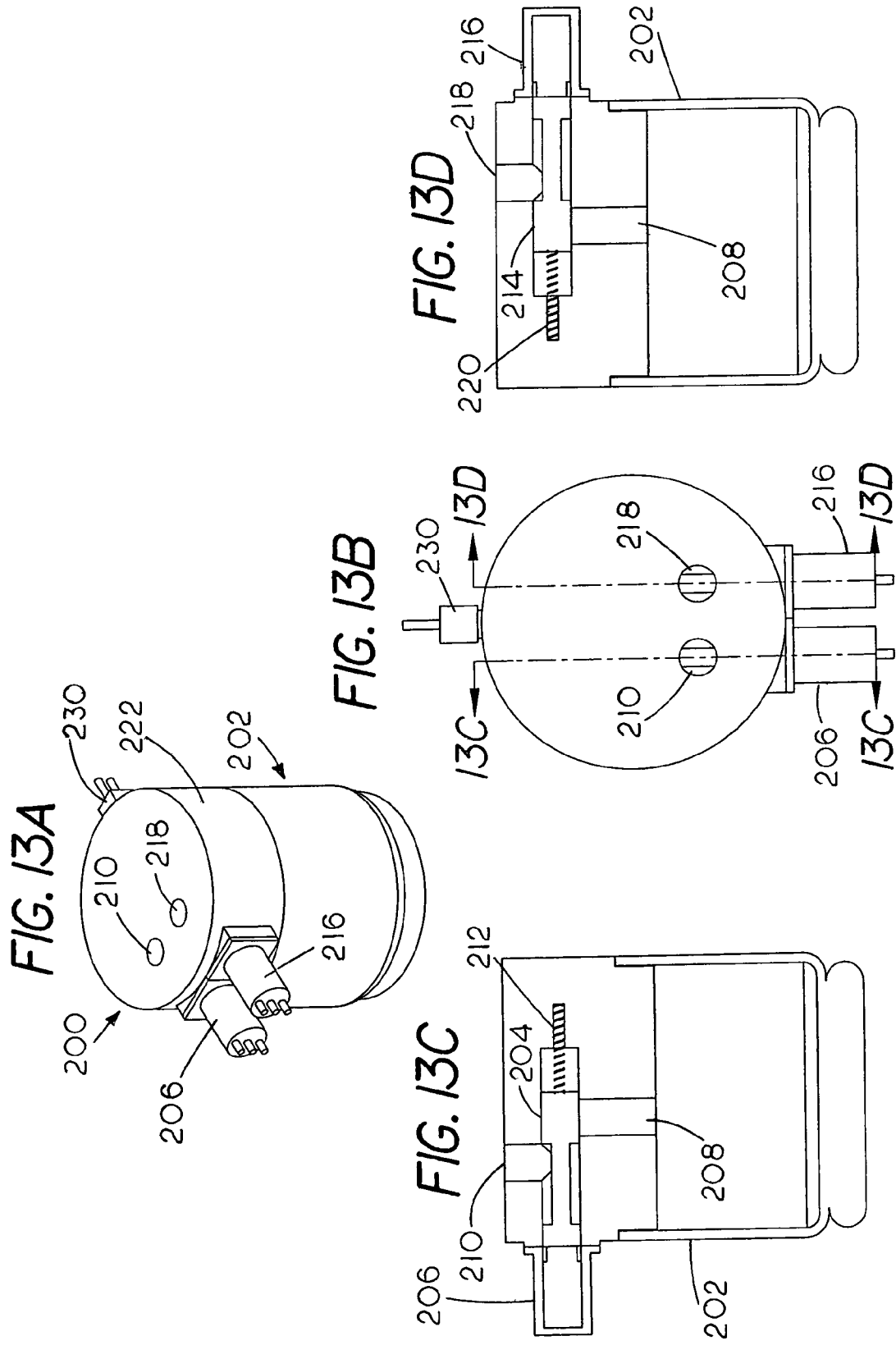

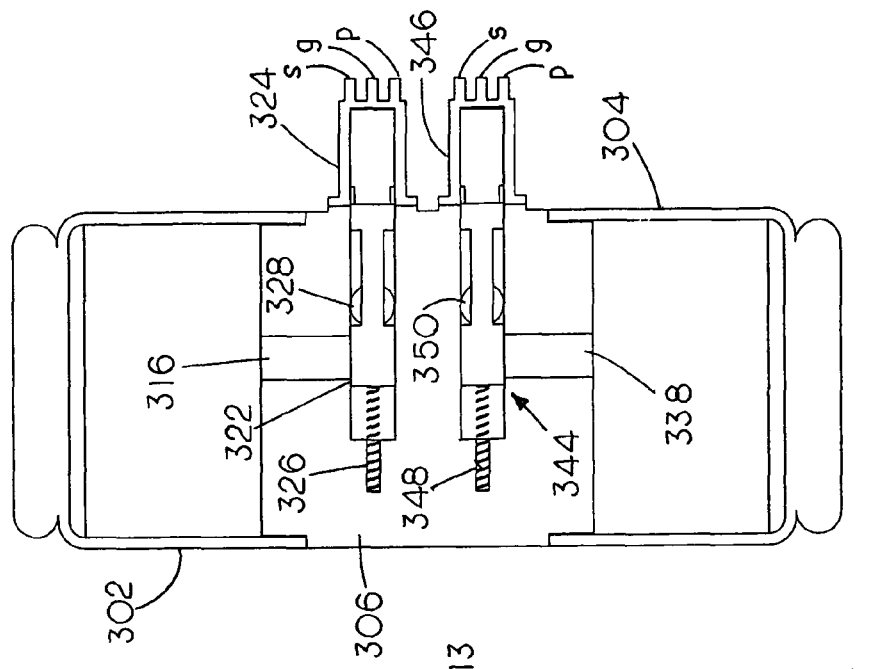
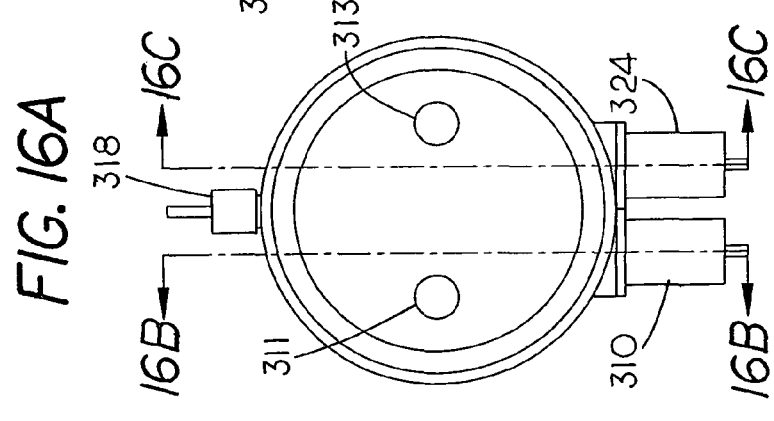
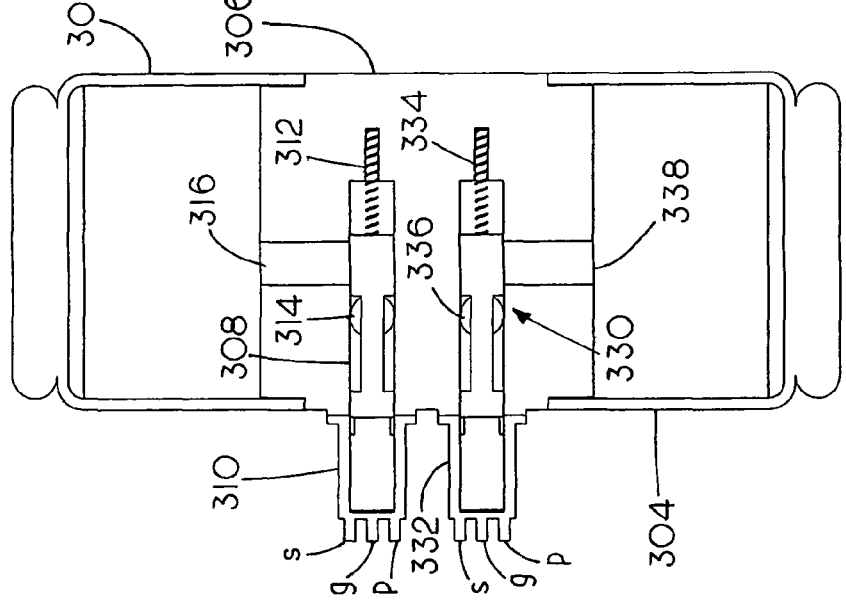

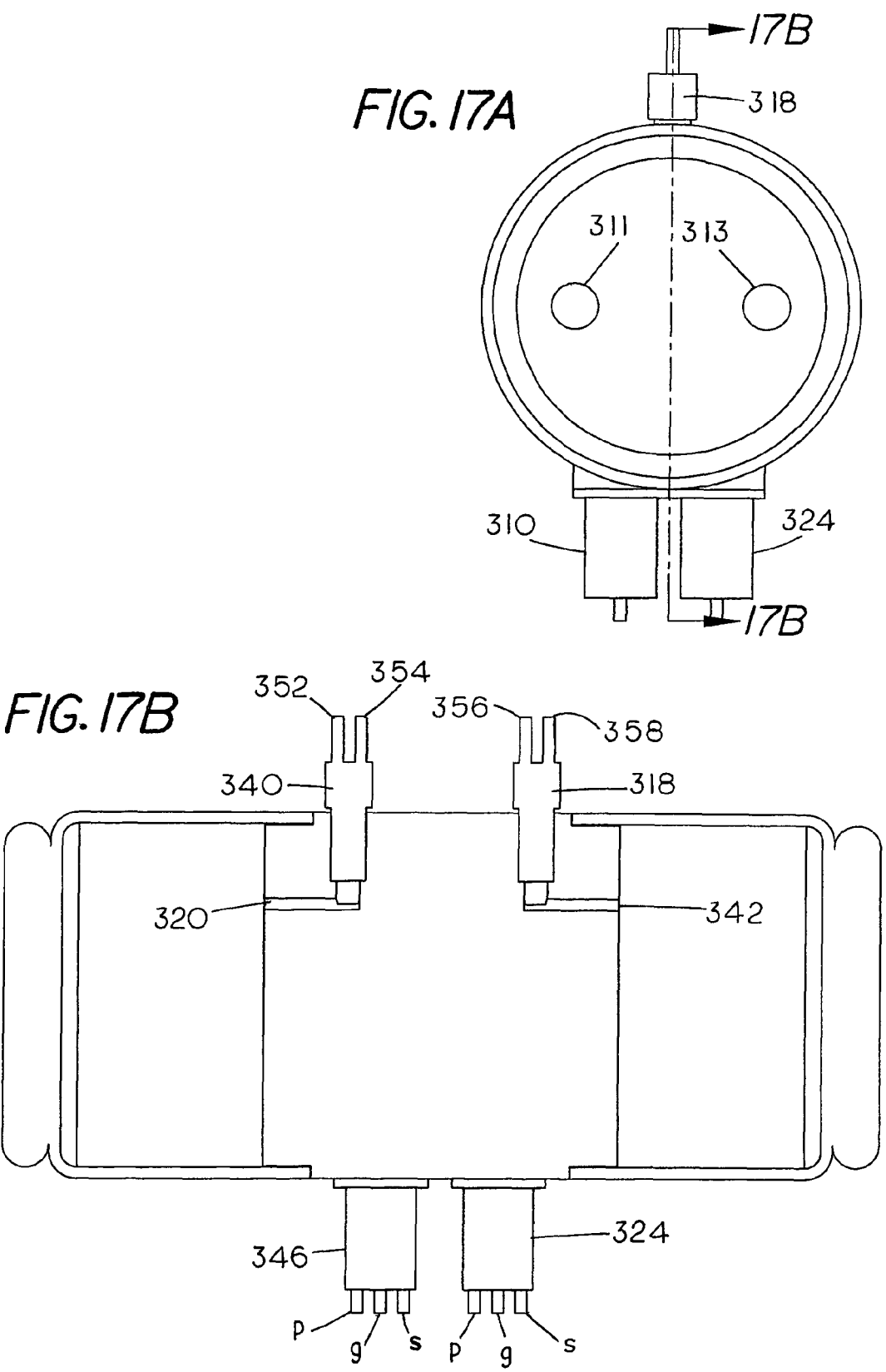

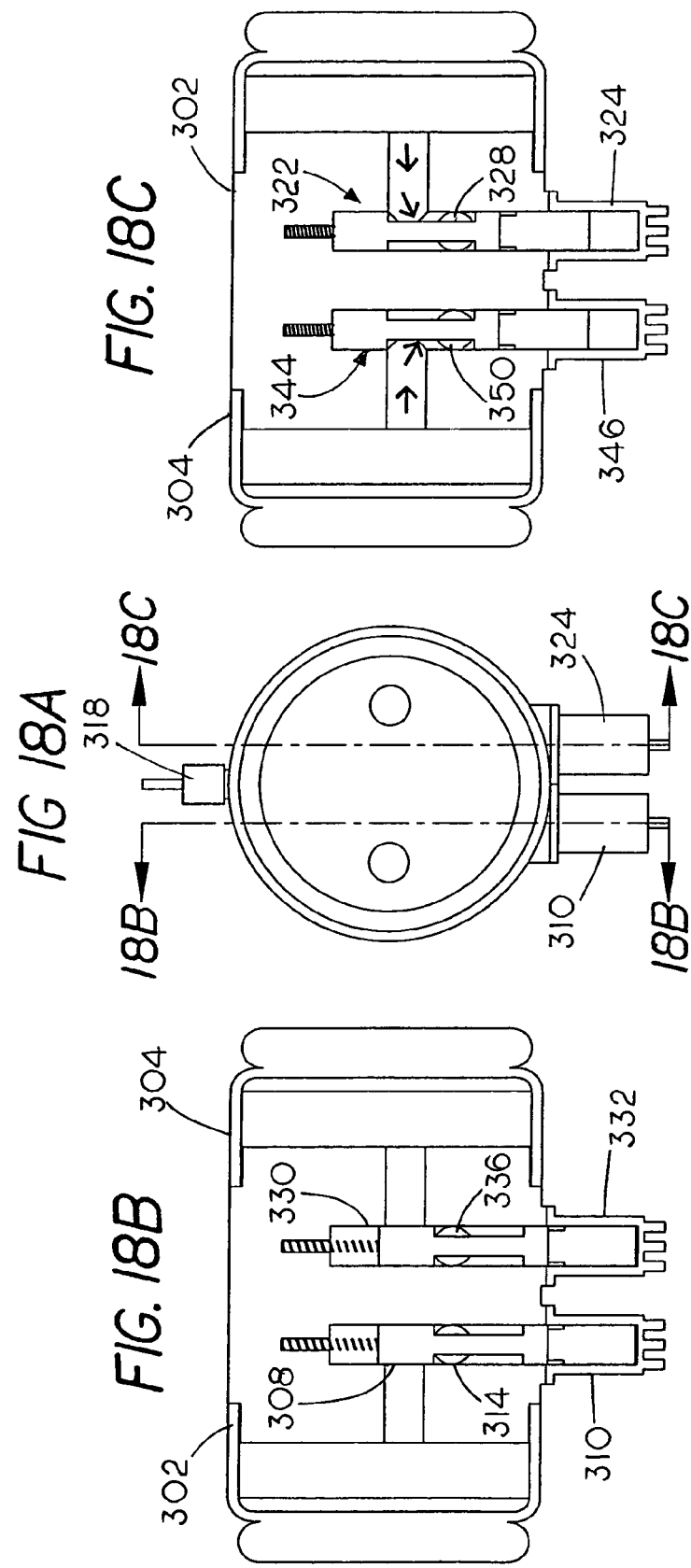

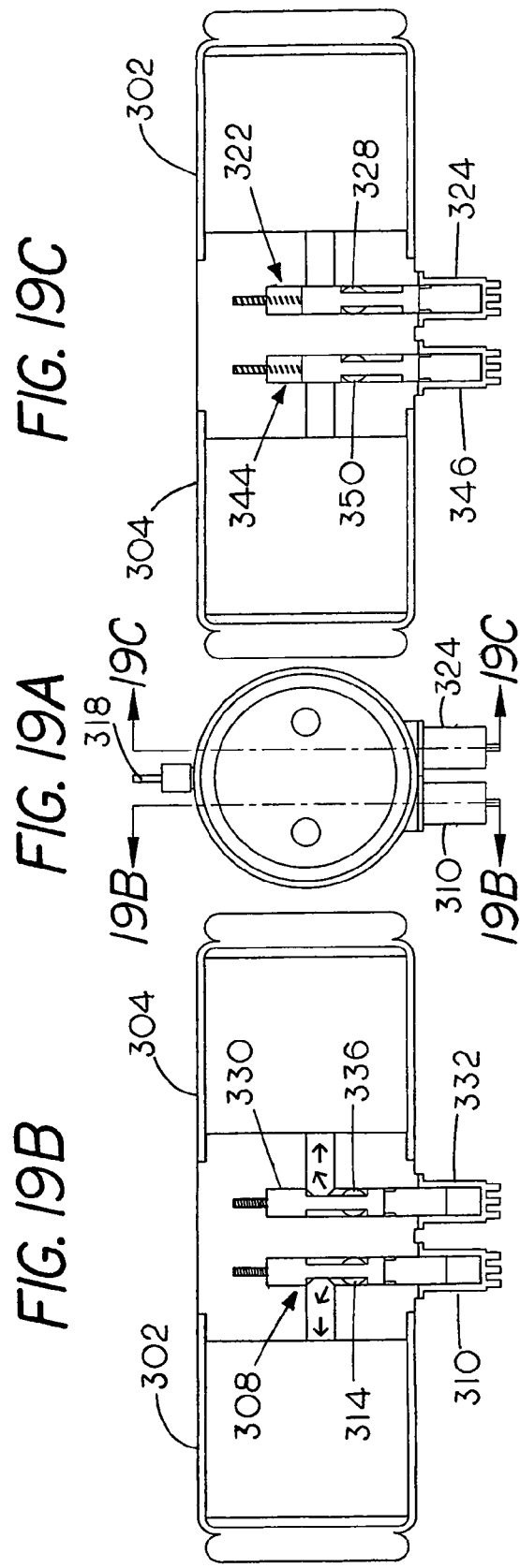

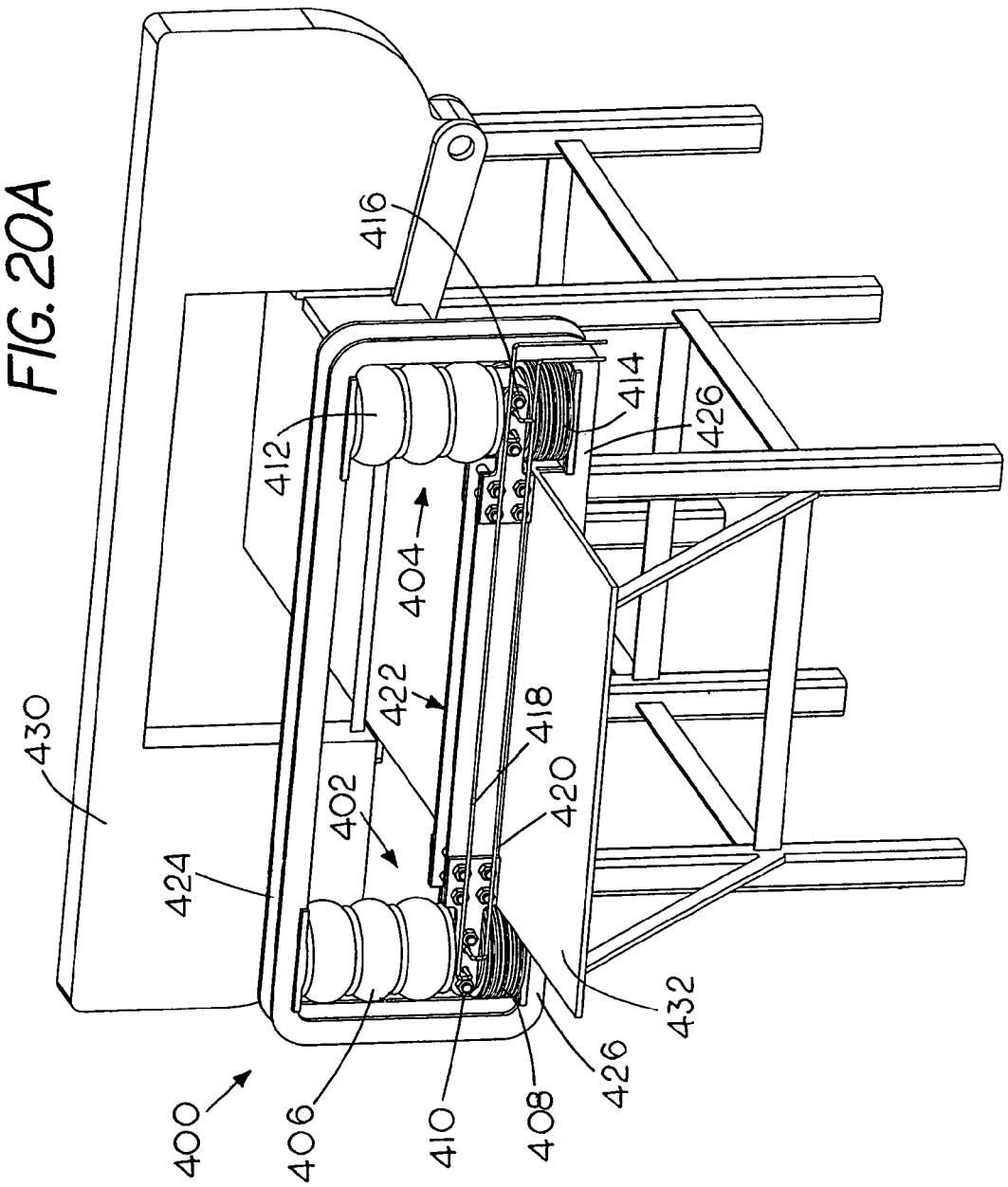

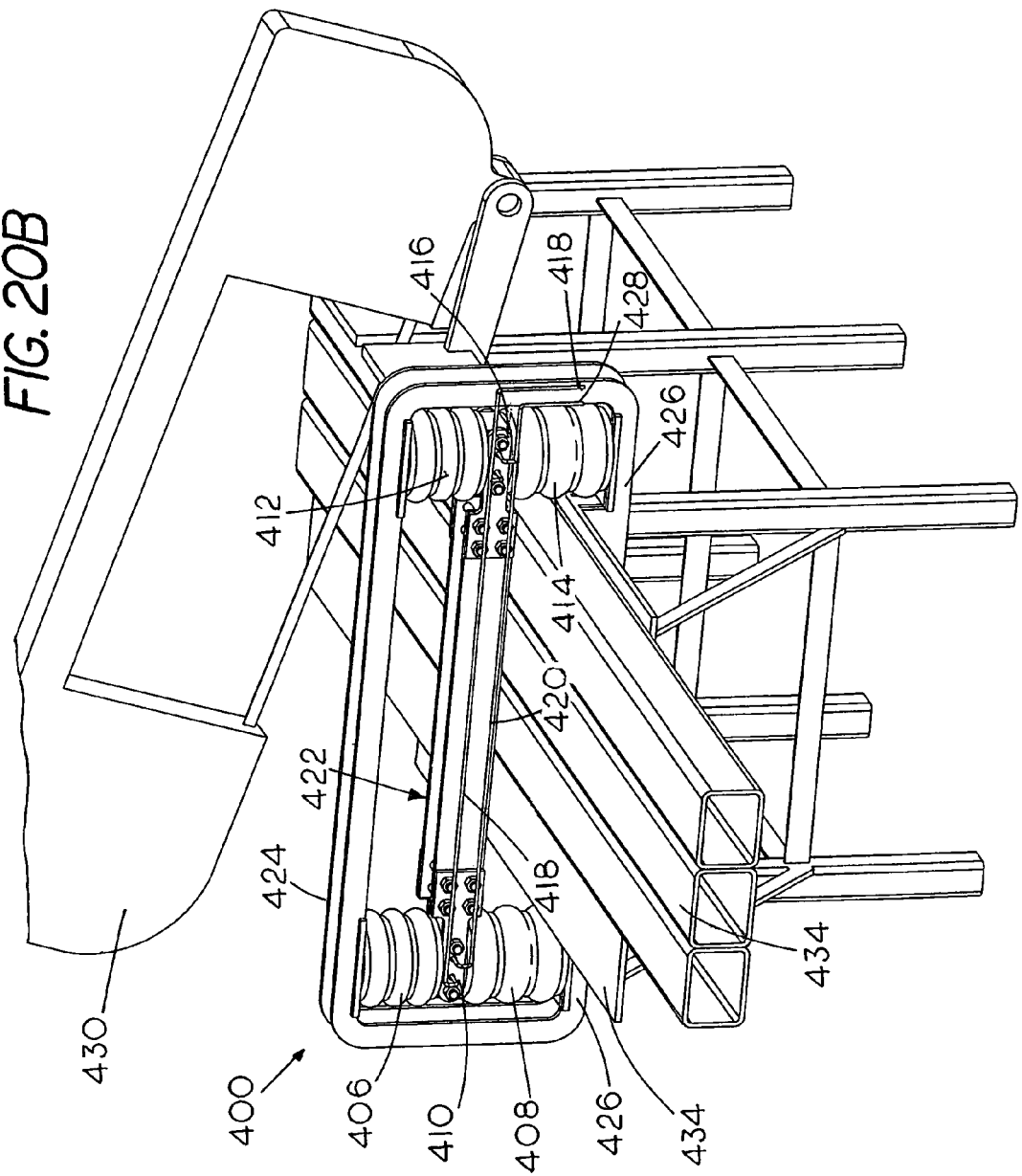

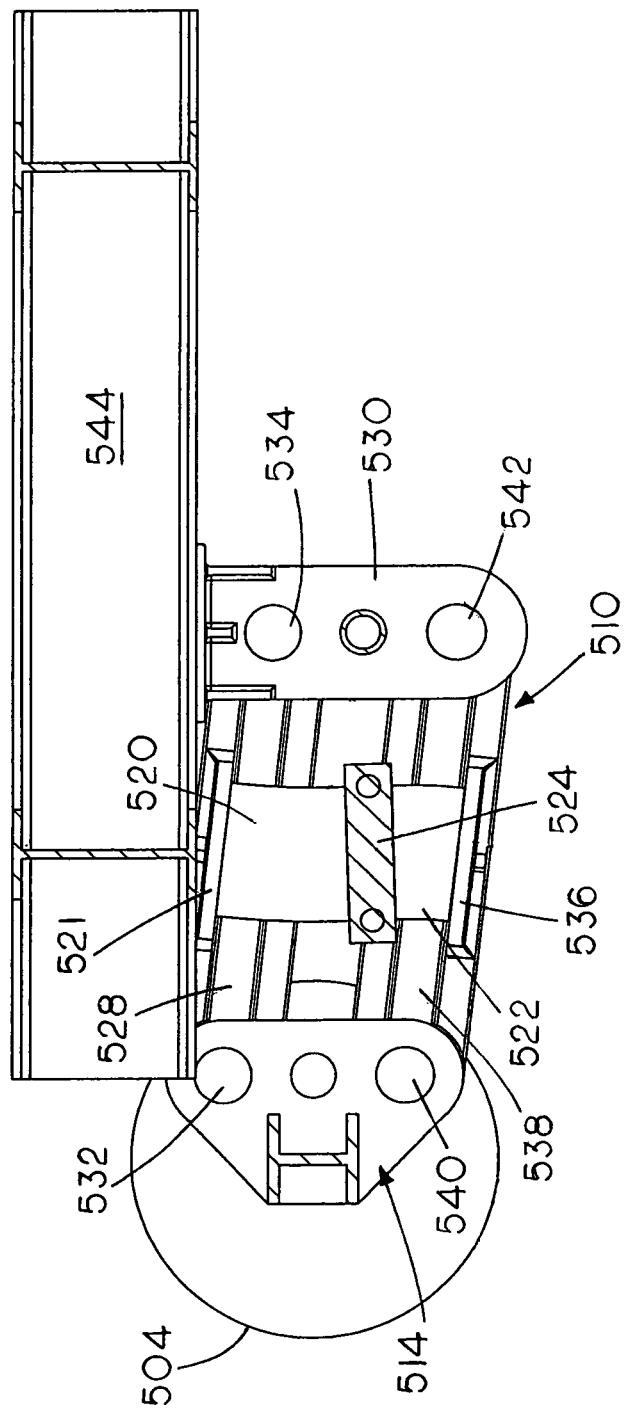

PNEUMATIC ACTUATORS

CROSS-REFERENCED TO RELATED APPLICATIONS

Not applicable

STATEMENT REGARDING FEDERALLY SPONSORED RESEARCH OR DEVELOPMENT

Not applicable

BACKGROUND OF THE INVENTION

I. Field of the Invention

The present invention relates generally to the field of pneumatic actuators suitable for use in various types of machinery or other devices for providing deployment and retraction forces during use. More specifically, the present invention relates to a pneumatic actuating system having a mounting base adapted to carry one or more inflatable pneumatic chambers that are controlled by an internal control valve system located in the mounting base. Opposed pneumatic chambers enable bi-directional operation.

II. Related Art

Pneumatic actuating systems of a variety of types have been associated with the operation of many devices for some time, including mechanical implements of varying kinds. An example of such a concept is illustrated and described in U.S. Pat. No. 8,534,373 B2, which shows the use of multiple airbag units to deploy and retract a variety of field-conditioning implements. It would provide a distinct advantage if a compact bi-directional pneumatic actuating unit could be provided with an integral internal control valve system to deploy and retract various devices.

SUMMARY OF THE INVENTION

By means of the present invention, there is provided a pneumatic actuator unit concept which includes a unitary structure that has single or dual inflatable pneumatic air chambers mounted on and fixed to a common central base member or plate member that provides a base for the air chambers. Dual air chambers can apply force in different directions with respect to the base member. The operating air is supplied by way of access ports located in the central base member which also includes an integral internal control valve system. The air chambers are preferably airbag devices which may be sleeve-type airbags, single or multiple convoluted airbags or other inflatable apparatuses.

The pneumatic actuating units of the present invention may be mounted in an arrangement in which the position of each of the remote ends of opposed pneumatic chambers is fixed so that the central base member can be used to apply force and move a load according to the inflation of the opposed pneumatic chambers. Preferably, the pneumatic actuating units are mounted in a manner that fixes the position of the central base member and allows the ends of the opposed pneumatic chambers remote from the central base member to apply force based on the inflation of the opposed pneumatic chambers and apply force to a load accordingly.

Embodiments include a double-acting airbag system that incorporates a mounting arrangement that has a central base adapted to carry a pair of airbags mounted on opposite sides of the central base. The central base further includes an internal control valve system and is adapted to be connected to at least one source of pressurized air. The valve system is configured to selectively supply pressurized to and cause air to be exhausted from each of the pair of airbags.

The double-acting airbag system of the invention includes arrangements in which only one selected opposed airbag can be inflated at a time. This type of arrangement may have a single air inlet or a plurality of air inlets. With multiple air inlets, the airbags can be operated at more than one selected pressure. In other arrangements the airbags can be inflated and exhausted independently and operated at the same or at different pressures. A further embodiment may employ a single airbag. In all of the embodiments, the control valves and access ports for the airbags are contained in the base and the assembly needs only to be supplied with pressurized air and electric control power, if necessary.

The internal control valve systems preferably include one or more two-position spool valves which are preferably solenoid operated between a normal or power-off position and a shifted position when the solenoid is energized. While solenoid-operated valves are preferred, other valve operating systems including air piloted spool valves, may be used.

It should be noted that inflatable pneumatic actuator in the form of conventional airbags have been found to be a preferred type of pneumatic operator, but other such devices could also be used.

The term "pneumatic actuator" or "pneumatic operator," as used herein is defined to mean a device which translates the energy from a compressed air supply into a linear or rotary force or movement.

The term "airbag", as used herein, is defined to mean any type of inflatable pneumatic operator, without limitation, including convoluted and non-convoluted devices with single and multiple air access ports, and ports at different locations. Single and double-acting units are also included. The present invention employs opposed units which may function as lift and down-force airbags.

BRIEF DESCRIPTION OF THE DRAWINGS

The foregoing features and advantages of the invention will become apparent to those skilled in the art from the following detailed description of one or more preferred embodiments, especially when considered in conjunction with the accompanying drawings in which like numerals depict like parts:

FIGS. 2A-2D are figures similar to FIGS. 1A-1D with the spool valve in the shifted or energized position and the upper airbag inflated;

FIGS. 5A and 5B are cut away side views that depict another embodiment of a double-acting airbag system according to the invention which includes dual solenoid-operated spool valves, both shown in the normal un-energized position this embodiment includes one intake and two exhaust ports;

FIGS. 5C and 5D are top and bottom cut away views, respectively, of the central base assembly of FIGS. 5A and 5B;

FIGS. 6A-6D are figures similar to FIGS. 5A-5D with both spool valves in the shifted or energized position and both airbags open to exhaust;

FIGS. 8A-8D are figures similar to that in FIGS. 5A-5D with the lower airbag inflated and the upper airbag collapsed;

FIGS. 9A and 9B are cut away side views that depict yet another variation of a double-acting airbag system according to the invention which includes dual solenoid-operated spool valves with two intake and two exhaust ports the two intake ports are connected to different sources of air with the spool valves in the normal, un-energized state;

FIGS. 9C and 9D are top and bottom cut away views, respectively, of the central base assembly of FIGS. 9A and 9B;

FIGS. 11A-11D are figures similar to FIGS. 9A-9D with the upper airbag inflated and the lower airbag collapsed;

FIG. 13A is a perspective view of another airbag assembly embodiment in which two spool valves operate the airbag and a pressure sensor is included;

FIG. 13B is a top view of the airbag assembly of FIG. 13A;

FIG. 13C is a sectional view along B-B of FIG. 13B;

FIG. 13D is a sectional view along A-A of FIG. 13B;

FIG. 16A is a top view of the airbag assembly of FIG. 15;

FIG. 16B is a sectional view along B-B of FIG. 16A showing inlet valves in their normal position;

FIG. 16C is a sectional view along A-A of FIG. 16A showing exhaust valves in their normal position;

FIG. 17A is a top view of an airbag assembly similar to FIG. 16A;

FIG. 17B is a sectional view along lines C-C of FIG. 17A showing pressure sensors and access openings to airbags;

FIG. 18A is a top view similar to FIG. 16A to illustrate different side cut away sectional views;

FIGS. 18B and 18C are left and right cut away sectional views from FIG. 18A showing intake and exhaust valves, respectively, with the embodiment in the pressure lowering or deflating for both airbags;

FIGS. 19A-19C are views similar to FIGS. 18A-18C showing intake and exhaust valves in cut away sectional views with the system in the inflate mode for both airbags;

FIGS. 20A-20C illustrate a pair of double-acting airbags in accordance with the invention in an assembly in which the outer ends are constrained and the central bases are free to raise and lower moving a connected member; and FIGS. 21A-21D illustrate another assembly in which an axle assembly is raised and lowered using a pair of double-acting airbags in which the central bases are fixed and the outer ends of the airbags control the movement of the axle.

DETAILED DESCRIPTION

Figure 1A:
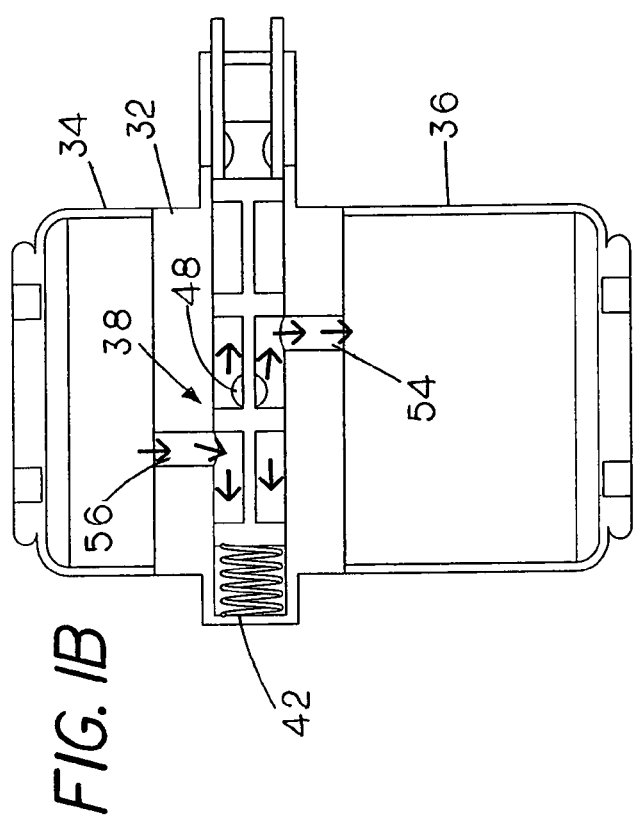
FIGS. 1A and 1B are cut away side views that depict a first embodiment of the invention in the form of a double-acting airbag in which one airbag can be inflated at a time, shown with the spool valve in the normal position and the lower airbag inflated.
Figure 1C:
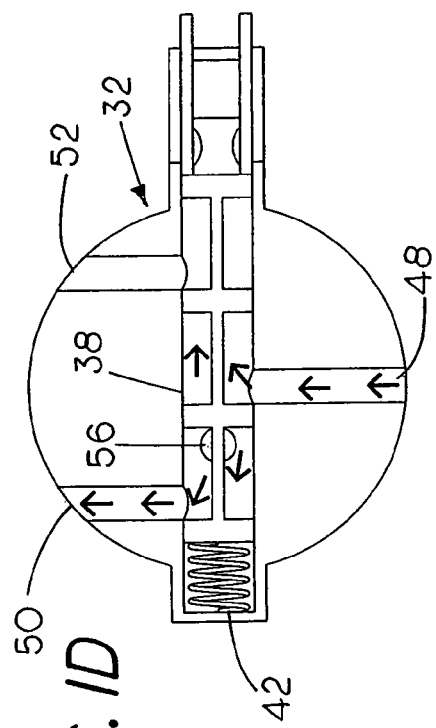
FIG. 1C is a top cut away image of the central base assembly of FIGS. 1A and 1B.
Figure 1B:
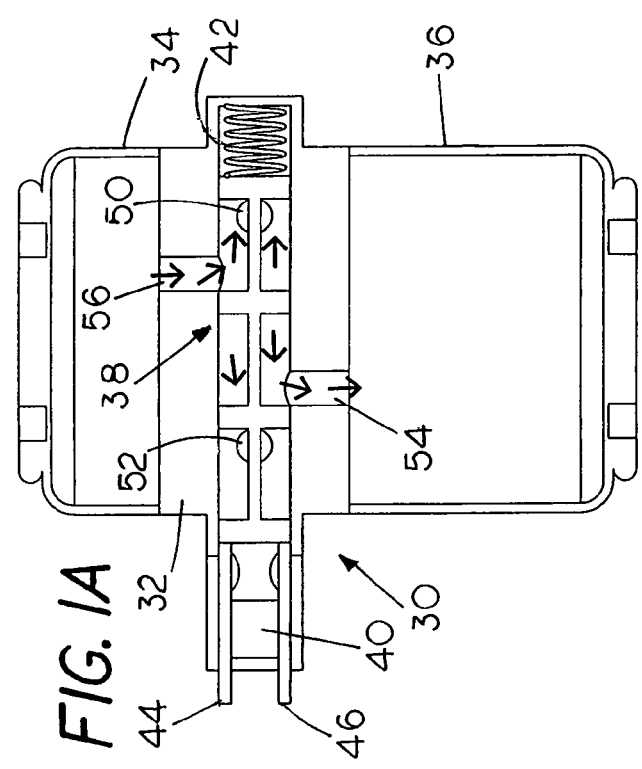
Figure 1D:
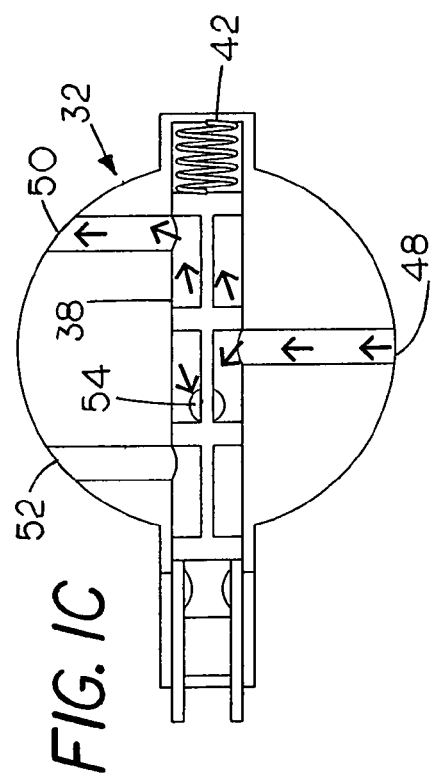
FIG. 1D is a bottom cut away image of the central base assembly of FIGS. 1A and 1B.
Figure 3A:
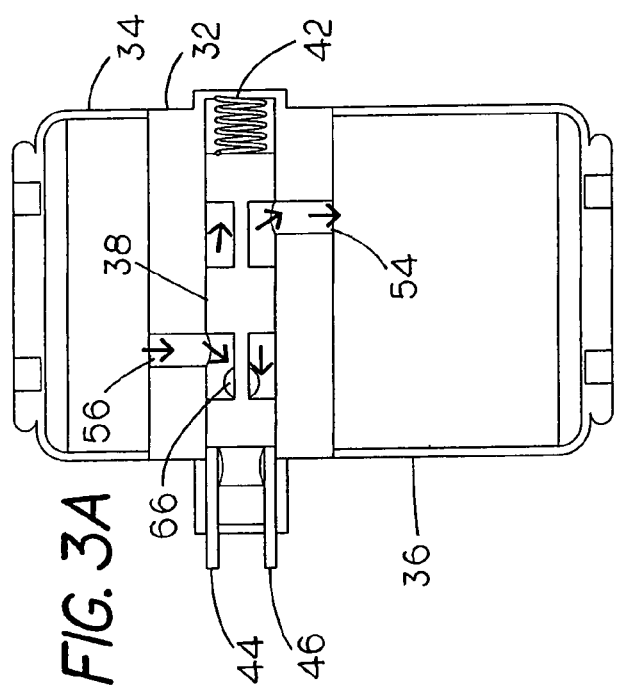
FIGS. 3A and 3B are cut away side views of a slightly modified second embodiment of the invention in which one airbag can be inflated at a time but in which a plurality of pressures can be selected for each airbag shown with the spool valve in the normal position and the lower airbag inflated.
Figure 3B:
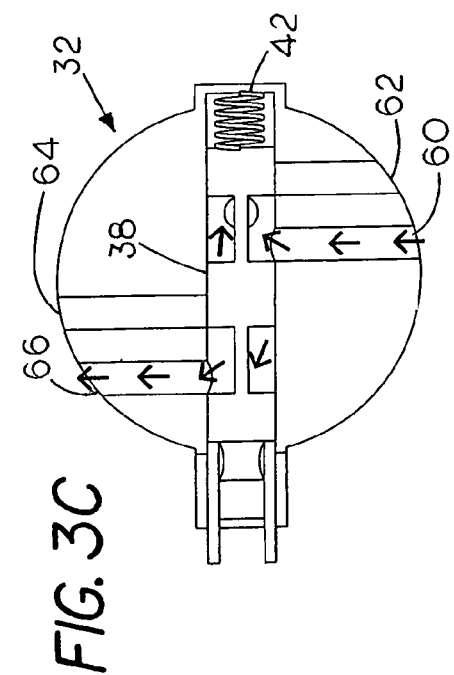
Figure 3C:
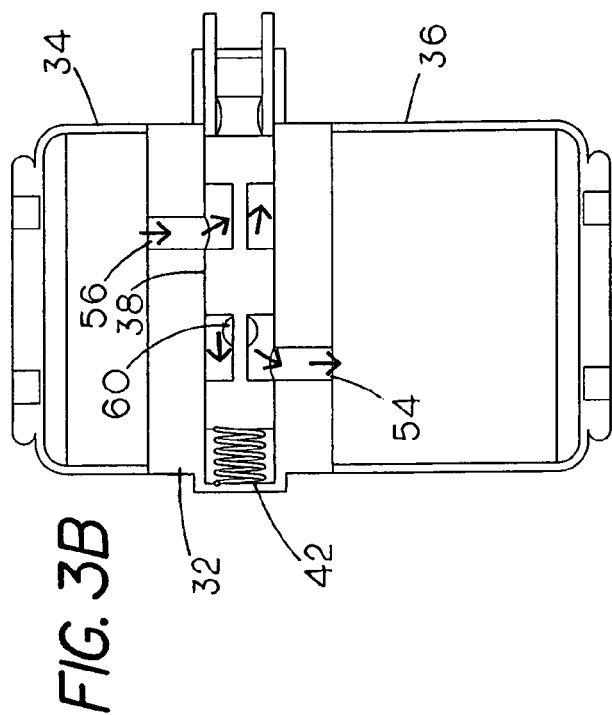
FIG. 3C is a top cut away image of the central base assembly of FIGS. 3A and 3B.
Figure 3D:
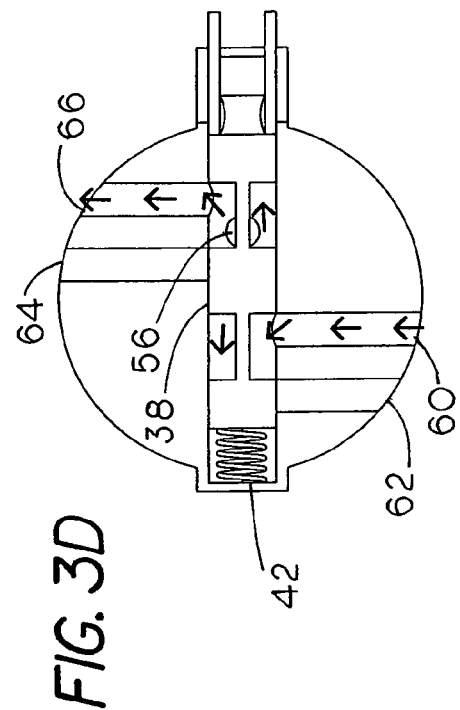
FIG. 3D is a bottom cut away image of the central base assembly of FIGS. 3A and 3B.
Figure 4A:
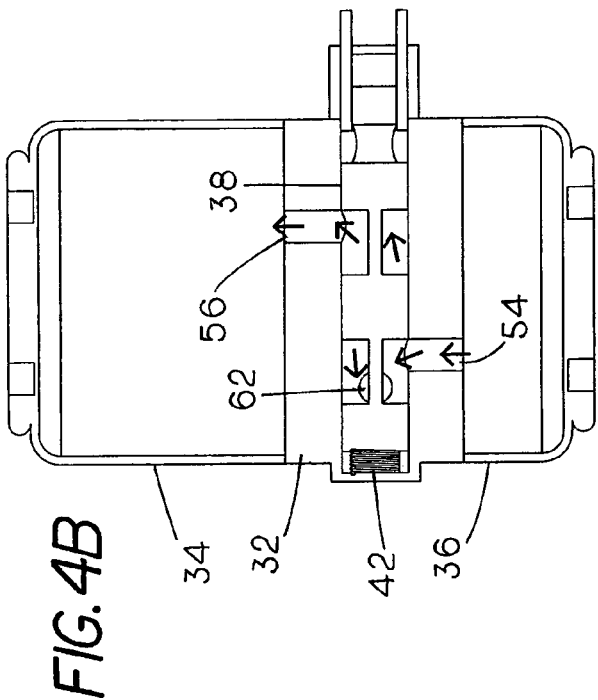
FIGS. 4A-4D are figures similar to FIGS. 3A-3D with the spool valve in the shifted or energized position and the upper airbag inflated.
Figure 4B:
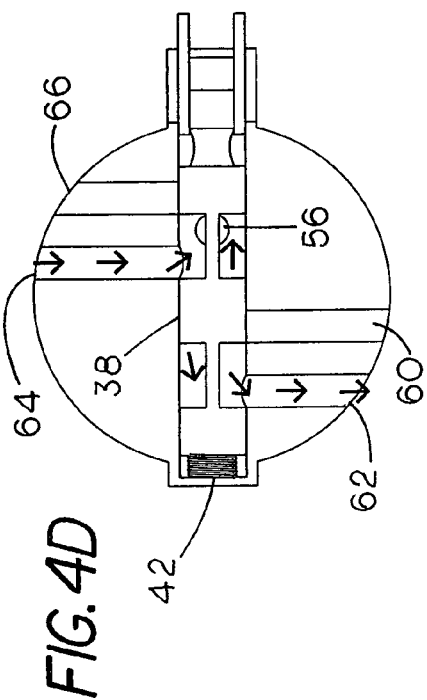
Figure 4C:
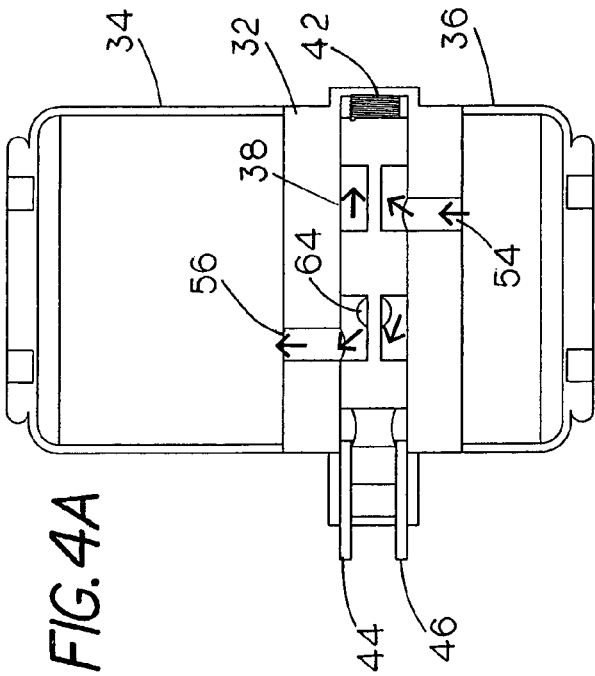
Figure 4D:
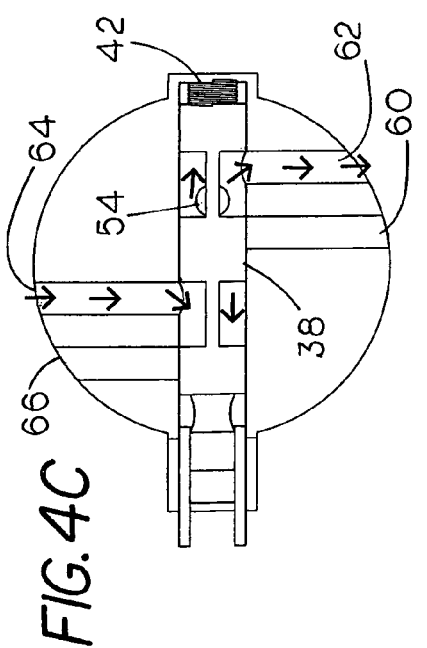
Figure 7A:
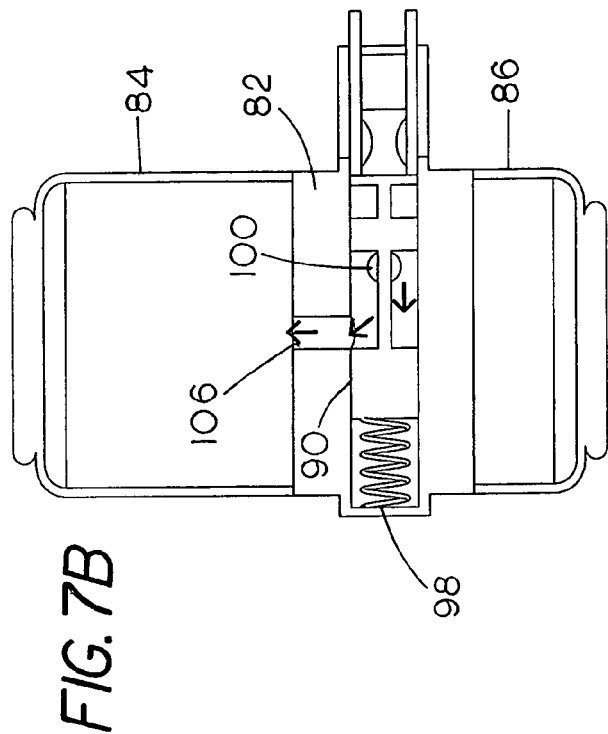
FIGS. 7A-7D are figures similar to FIGS. 5A-5D with the upper airbag inflated and the lower airbag collapsed.
Figure 7B:
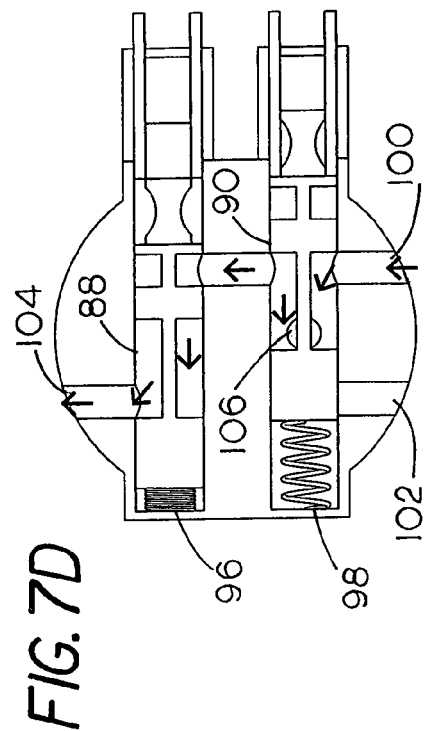
Figure 7C:
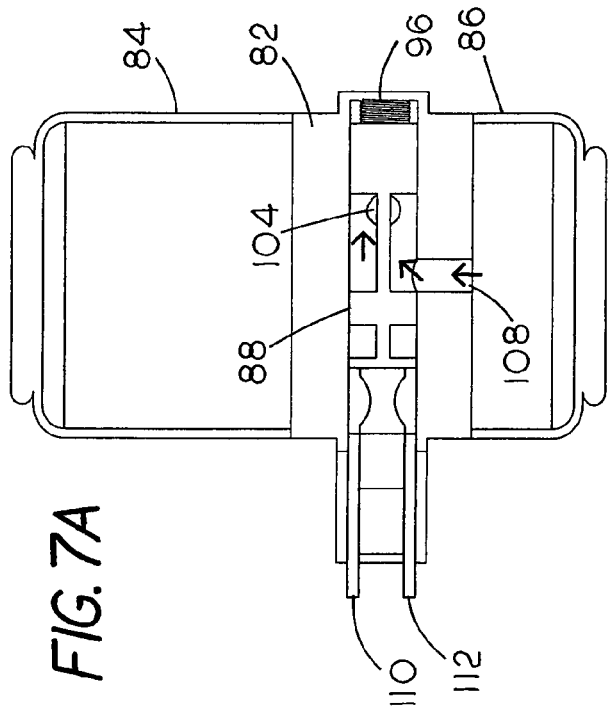
Figure 7D:
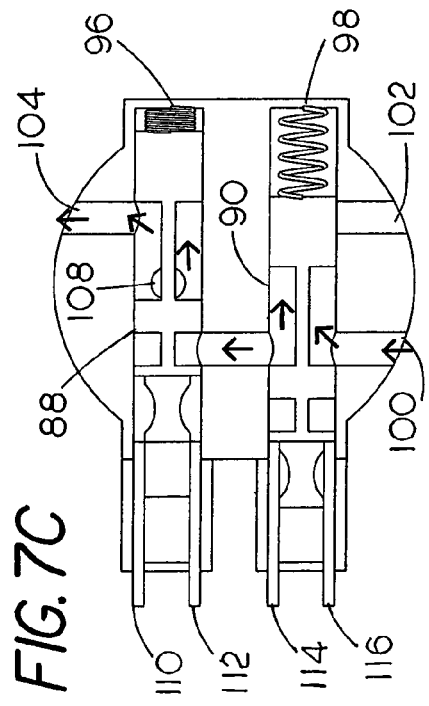
Figure 10B:
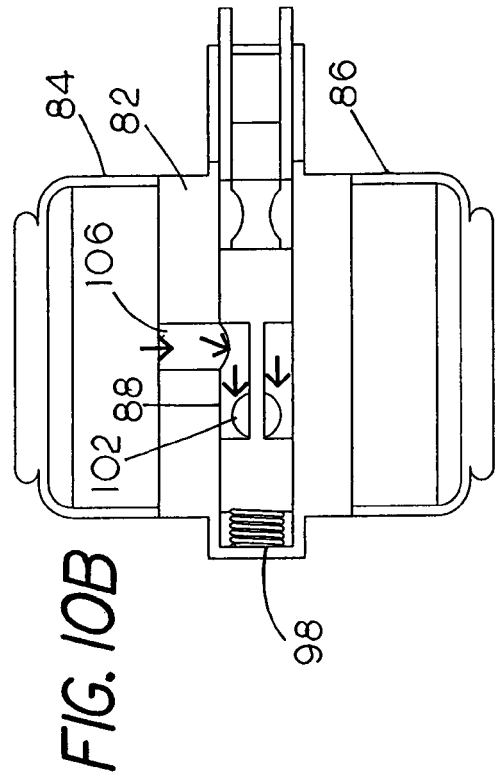
FIG. 10A-10D are figures similar to FIGS. 9A-9D with both spool valves in the shifted or energized position and both airbags open to exhaust and collapsed.
Figure 10D:
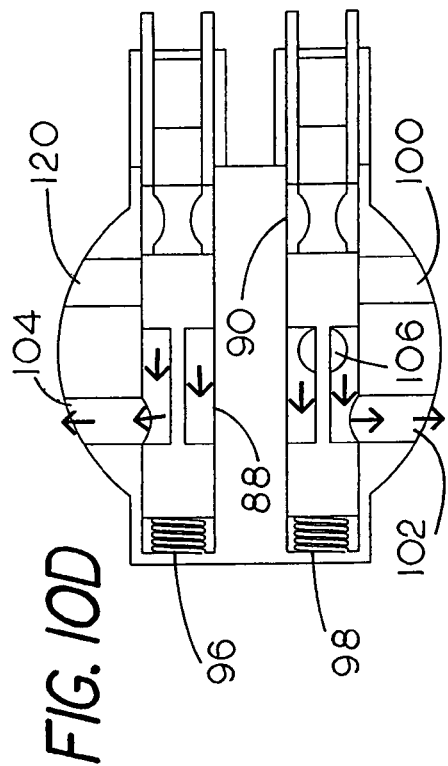
Figure 10A:
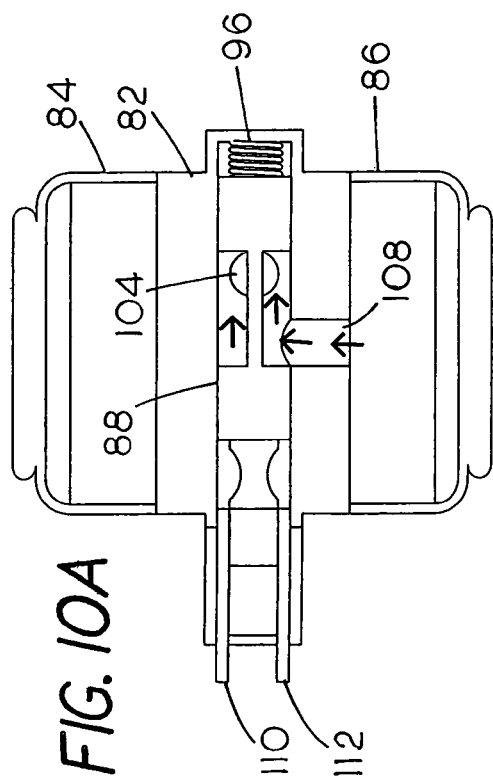
Figure 10C:
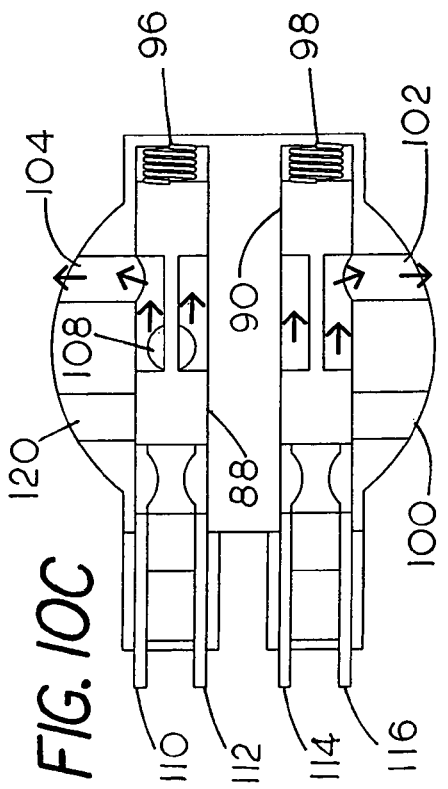
Figure 12A:
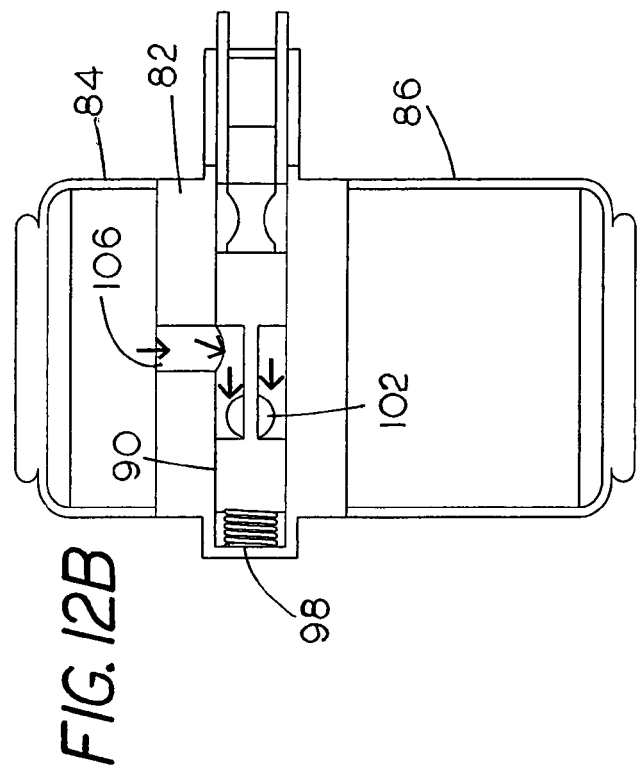
FIGS. 12A-12D are figures similar to FIGS. 9A-9D with the lower airbag inflated and the upper airbag collapsed.
Figure 12B:
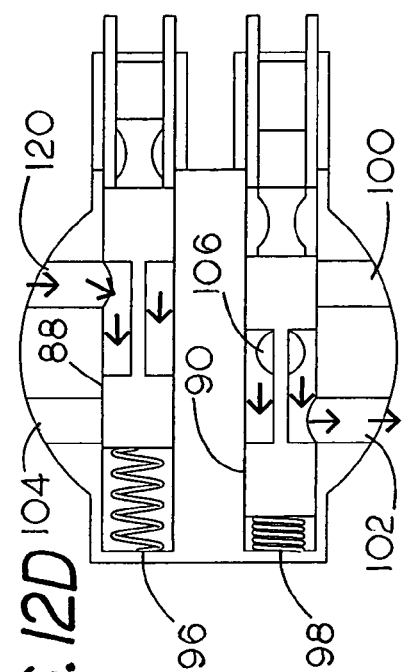
Figure 12C:
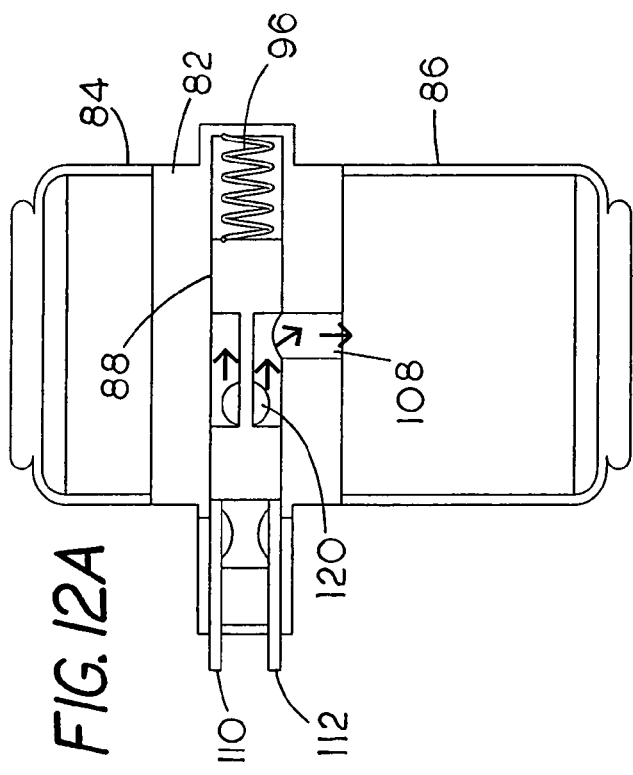
Figure 12D:
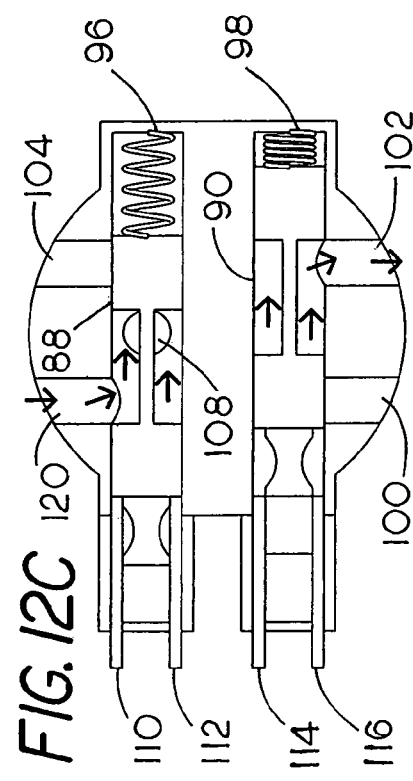

The detailed description of the illustrative embodiments is intended to illustrate representative examples of the inventive concepts and is not intended to exhaust or limit the scope of those concepts. The examples are to be read in connection with the accompanying drawings, which are to be considered part of the entire written description of this invention. In the description, relative terms such as "lower", "upper", "horizontal", "vertical", "above", "below", "up", "down", "top" and "bottom", "left" and "right", as well as derivatives thereof (e.g., "horizontally", "downwardly", "upwardly", etc.) should be construed to refer to the orientation as then described or as shown in the drawings under discussion. These relative terms are for convenience of description and do not require that the apparatus be constructed or operated in a particular orientation. Terms such as "connected", "connecting", "attached", "attaching", "join" and "joining" are used interchangeably and refer to one structure or surface being secured to another structure or surface or integrally fabricated in one piece, unless expressively described otherwise.

One embodiment of the invention is depicted in FIGS. 1A-1D and 2A-2D. In FIGS. 1A-1D there is shown a double-acting airbag system, generally at 30 that includes a central base 32 adapted to carry a pair of airbags mounted on the central base. These include an upper airbag 34 and a lower airbag 36. The central base includes a spool valve assembly 38 with solenoid operator 40 and biasing spring 42 electrical connections are shown at 44 and 46. The central base 32 also includes a single air entry or supply port 48, on upper exhaust port 50 and a lower exhaust port 52. Arrows are used to show nominal directions of air flow. In FIGS. 1A-1D the lower airbag 36 is inflated and the upper airbag 34 is collapsed. Thus, air is depicted as entering the lower bag through an internal lower bag port 54 and leaving the upper airbag through upper bag port 56 and exhaust port 50.

Conversely, in FIGS. 2A-2D, the solenoid 40 is energized and the spool valve is shifted compressing the spring 42, the upper airbag 34 is inflated and the lower airbag 36 is collapsed. Air is depicted as entering the upper airbag through an upper internal top bag port 56 and leaving the lower airbag 36 via lower bag port 54 and exhaust port 52.

FIGS. 3A-3D and 4A-4D depict an embodiment similar to that of FIGS. 1A-1D with certain modifications. Thus, in this embodiment, there are two intake ports 60 and 64 and two exhaust ports 62 and 66. The lower airbag 36 is accessible to inlet port 60 and outlet or exhaust port 62 and upper airbag 34 is accessible to inlet port 64 and exhaust port 66. By incorporating two inlet ports 60 and 64, two separate sources in pressurized air can be supplied and the upper and lower airbags can be inflated at different pressures. The FIGS. 3A-3D show the spool valve in the normal position with the solenoid not energized and the lower airbag 36 inflated and the upper airbag 34 collapsed. Conversely, FIGS. 4A-4D show the spool valve shifted with the solenoid energized. The upper airbag 34 is inflated and the lower airbag 36 is collapsed.

FIGS. 5A-8D depict an alternate embodiment of a double-acting airbag system according to the invention in which dual solenoid operated spool valves are incorporated along with one intake and two exhaust ports. This embodiment enables independent operation of the upper and lower airbags.

In FIGS. 5A and 5B there is shown another embodiment of a double-acting airbag system, generally at 80, that includes a central base 82 adapted to carry a pair of opposed airbags mounted on the central base. These include an upper airbag 84 and a lower airbag 86. The central base includes a pair of spool valve assemblies 88 and 90 with solenoid operators 92 and 94 and return springs 96 and 98, respectively, as best shown in the cut away views of FIGS. 5C and 5D. This embodiment includes a single intake port 100 and upper and lower airbag exhaust ports 102 and 104, respectively. The upper airbag 84 is operated by the spool valve assembly 90 and the lower airbag is operated by the spool valve assembly 88.

FIGS. 5A-5D depict the system with both of the spool valves in the normal, unenergized position and the return springs extended. This connects the intake port 100 with both the upper internal bag port 106 and lower internal bag port 108 allowing both airbags to inflate. In the FIGS. 6A-6D, both of the spool valve solenoids 92 and 94 are energized shifting the associated spool valves 88 and 90 thereby connecting both airbags to their respective exhaust ports allowing both airbags to collapse. Electrical connections are shown at 110, 112, 114 and 116. FIGS. 7A-7D and 8A-8D show selective inflation of upper and lower airbags, respectively.

FIGS. 9A-12D depict yet another embodiment that represents a modification of the embodiment of the embodiment of FIGS. 5A-8D. This embodiment combines separate upper airbag and lower airbag spool valve controls with one inlet port and one exhaust port for each airbag. Thus, a second air inlet 120 is provided that connects with lower airbag 86 through internal port 108. In FIGS. 9A-9D both valves are in their normal, unenergized position allowing pressurized air to enter and inflate both upper and lower airbags using separate connected sources of pressurized air (not shown). In FIGS. 10A-10D, both valves are shifted, compressing the associated return spring and both bags are connected to exhaust ports causing them both to deflate.

In FIGS. 11A-11D, the valve controlling the lower airbag is selectively energized with the valve controlling the upper airbag in the normal position thereby selectively inflating the upper airbag and collapsing the lower airbag. In FIGS. 12A-12D the converse is shown with the lower airbag 86 inflated and the upper airbag 84 collapsed.

FIGS. 13A-19C depict a further embodiment of the airbag system of the invention in which each airbag is operated using two spool valves. The embodiment is illustrated with single and dual opposed mounted airbags. In FIGS. 13A-13D there is shown a version, generally at 200 having a single mounted airbag 202. The system includes an intake spool valve 204 with solenoid 206 connected between airbag access port 208 and intake port 210. The valve 204 is shown in its normal, unenergized state in which the connection to the intake port is closed and the return spring 212 extended as shown in FIG. 13C. FIG. 13D illustrates the exhaust control with exhaust spool valve 214 controlled by solenoid 216 connecting airbag access port 208 with exhaust port 218. The valve 214 is also shown in the normal, unenergized state with return spring 220 extended and the connection to exhaust port 218 is closed. In this configuration, the intake and exhaust ports may be located in the face of system base 222, to which the airbag 202 is fixed, as shown.

Figure 14A:
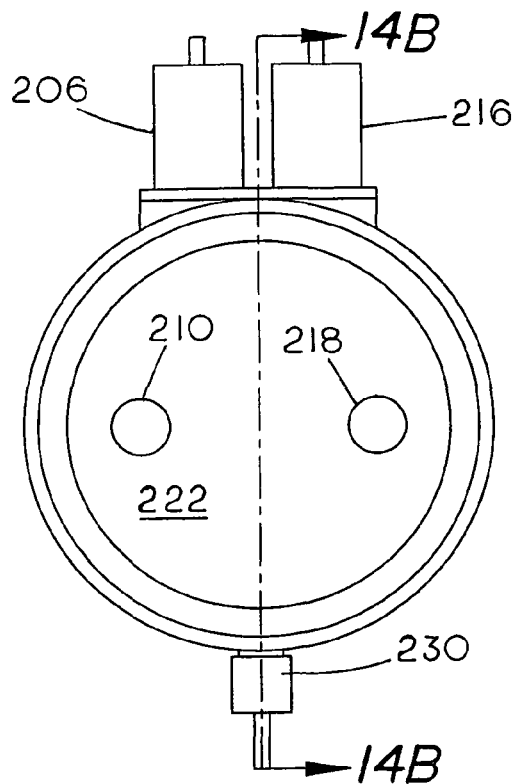
FIG. 14A is a top view of an airbag assembly similar to FIG. 13B.
Figure 14B:
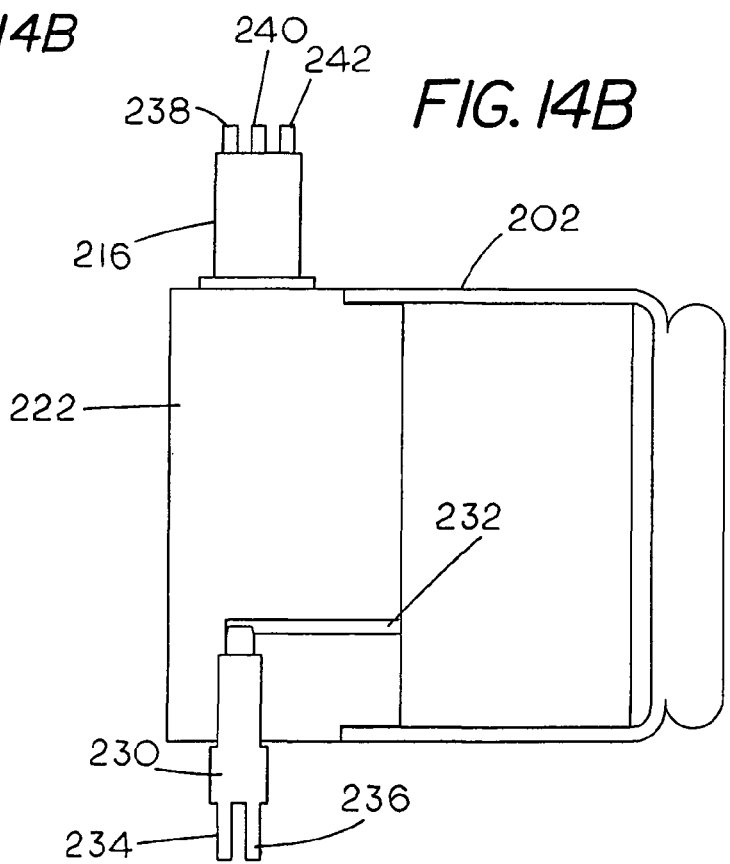
FIG. 14B is a sectional view showing the access of a pressure sensor.
Figure 15:
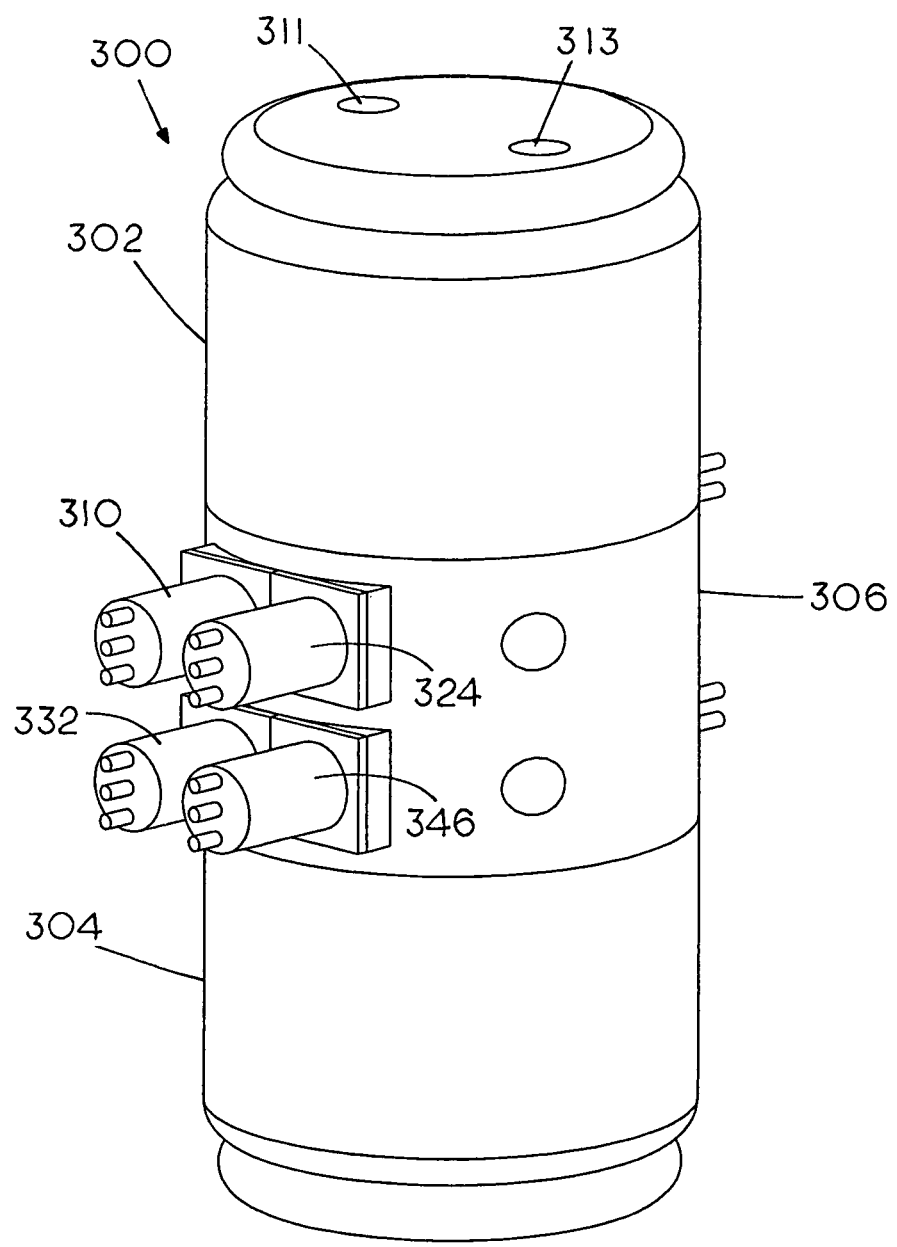
FIG. 15 is a perspective view of a double-acting airbag version of the assembly of FIG. 14A.

As best shown in FIG. 14B, the airbag system 200 is provided with a pressure sensor 230 in communication with the inside of the airbag 202 through a drilled access port 232. The pressure sensor 230 is connected to a power supply through connector 234 and includes a signal connection at 236. Solenoid 216 is shown with a power connection 238, a ground connection 240 and a signal connection at 242.

The pressure sensor 230 may be connected to a central processing unit or other well known device that in turn, sends a control signal to each solenoid associated with the airbag system. The solenoids then operate the intake and exhaust valve as needed to add or exhaust air to control the pressure inside the airbag based on a selected set point or range. The airbag system 200 can be individually controlled or ganged with other similar systems in any desired control scheme.

The pressure sensor is designed to continually monitor the airbag pressure. Thus, if a signal indicates that the pressure in the airbag has fallen below a desired minimum, this will be processed and a control signal will, in turn, initiate the addition of compressed air by operation of the intake valve until the set point is reached. Conversely, if the pressure is above a desired maximum pressure, a control signal will activate the exhaust valve which will release air until the desired pressure is again achieved. A control signal to exhaust all the air and allow the airbag to collapse may also be included. As indicated, a selected command pressure can be used for any number of airbag systems ganged together possibly performing similar or the same tasks.

In a preferred embodiment that includes both intake and exhaust spool valves, the valves are controlled to remain closed unless a pressure adjustment is being made. This is an option in the design. In addition to the use of internal pressure sensors, external load sensors (not shown) can be added to determine, and optionally control, the amount of external force exerted by the airbag system and that can be controlled within an acceptable tolerance of a selected command force using the valve system.

FIGS. 15-19C depict an embodiment similar to that of FIGS. 13A-14B in a two-bag, double-acting configuration generally at 300. The system includes back-to-back upper and lower airbags 302 and 304, respectively. Each of the airbags is operated by a pair of spool valves including an intake and an exhaust valve and each bag is provided with a pressure sensor in the manner of single-bag embodiment 200.

Thus, airbags 302 and 304 are both mounted on a central base 306. Upper airbag 302 is provided with an intake valve 308 with solenoid operator 310 and return spring 312. Openings for possible mechanical connection are shown at the free end of airbag 302 at 311 and 313. The valve 308 connects an intake part 314 with an internal bag port 316. An upper airbag pressure sensor 318, as best seen in the rotated view of FIG. 17B, is connected through drilled port 320 to communicate with the interior of airbag 302. Airbag 302 further includes an exhaust spool valve 322 with solenoid operator 324 and return spring 326. The valve connects an upper airbag exhaust portion 328 with upper internal airbag port 316.

In a like manner, lower airbag 304 is provided with an intake spool valve 330 with solenoid operator 332 and selection spring 334. Spool valve 330 connects a lower airbag intake port 336 with a lower airbag internal access port 338. The lower airbag 304 also is provided with a pressure sensor 340 with access port 342. Airbag 304 also includes an exhaust assembly including spool valve 344 with solenoid operator 346 and return spring 348. That valve connects lower airbag exhaust port 350 with lower internal airbag port 338.

As best shown in FIG. 17B, pressure sensor 340 includes a power supply connector 352 and a signal connector 354 and pressure sensor 318 includes a power supply connector 356 and a signal connector 358. As with the solenoids in embodiment 200, each solenoid has a power connector, p, a ground connector, g, and a signal connector, s.

FIGS. 18A-18C shows the embodiment 300 with both upper and lower intake valves closed and both exhaust valves opened to allow all the air to be exhausted and the airbags collapsed. FIGS. 19A-19C depict the system with both upper and lower intake valves energized and both exhaust valves in the normal unenergized, closed position allowing both airbags to be pressurized. Of course, both bags can be operated separately and at any desired set pressure selected.

Figure 20C:
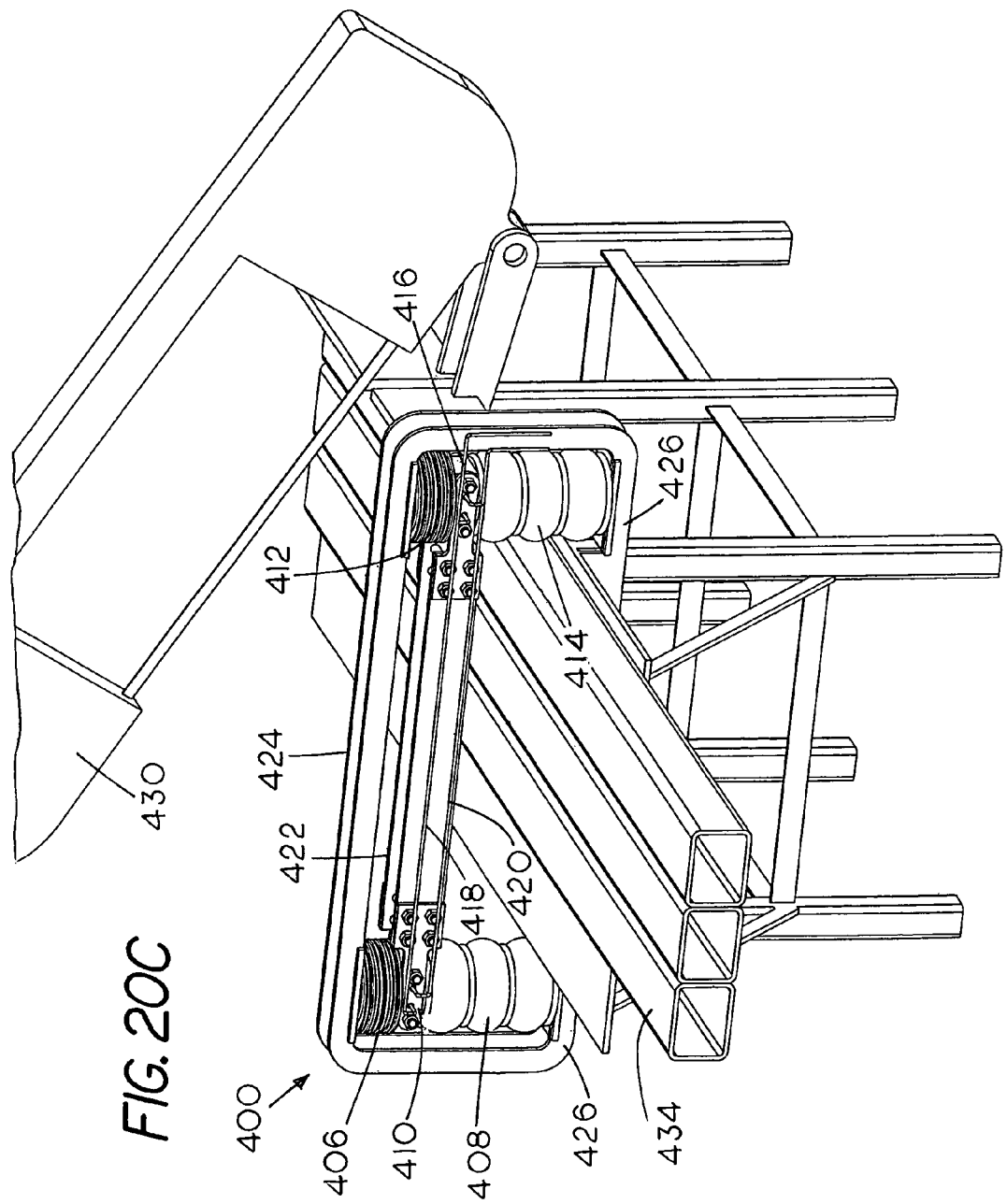

In FIGS. 20A-20C, there is shown an assembly which demonstrates the use of a pair of double-acting airbags in accordance with the invention in an arrangement in which the central base moves in accordance with airbag inflation/deflation and the outer ends of the airbags are constrained. FIG. 20A depicts a setup 400 including a pair of airbag assemblies 402 and 404 used to operate a clamping device on a band saw. Assembly 402 includes an upper airbag 406, a lower airbag 408 and central base 410. Airbag assembly 404 includes an upper airbag 412, a lower airbag 414 and a central base 416. Both airbag assemblies have dual air inlet ports for separate control of the upper and lower airbags, if desired, and two compressed air lines are shown at 418 and 420. A common clamp assembly 422 is connected between central bases 410 and 416. An outer constraining arrangement includes an upper aspect 424 and a lower aspect 426 that fix the outer ends of the airbags in back to back arrangement with the central bases 410 and 416.

In FIG. 20A, the arrangement is shown with the upper bags 406 and 412 inflated and the lower airbags 408 and 414 collapsed so that the connected assembly 422 is in a lowered state. Band saw 430 is shown in a lowered state and no work is depicted on table top 432. In FIG. 20B, both airbags in assemblies 402 and 404 are inflated and the assembly 422 has assumed a central location and is clamping work piece 434. Finally, in view 20C, lower airbags 408 and 414 are inflated and upper airbags 406 and 412 are collapsed so that assembly 422 is shown in a fully raised position so that work piece 434 can be removed and others inserted.

It will be appreciated that the central base of an airbag in an arrangement in which the outer ends are constrained and the central base is used as the moving element in a central system can be connected in any desired manner for the operation of an associated device.

FIGS. 21A-21D depict an arrangement 500 in which a pair of back-to-back double-acting airbag assemblies control the elevation of an axle assembly. In that arrangement, the central bases remain fixed and the outer ends of the associated airbags move with airbag inflation/deflation. An axle assembly 502 includes wheel hubs 504 and 506 and an axle 502. The axle 508 is attached to a pair of spaced pivoting parallelogram airbag operating arrangements 508 and 510 that are connected to axle 502 by assemblies 512 and 514, respectively. As best seen in the sectional views, which depict one of the two identical opposed airbag operating arrangements, they include an upper airbag 520, a lower airbag 522 and a central base 524. The upper airbag operates against a member 526 which is attached to an upper pivoting member 528 that is pivotally attached between assembly 512 and a fixed member 530 at 532 and 534, respectively. Similarly lower airbag 522 operates against a member 536 which is attached to a lower pivoting member 538 also pivotally connected between assembly 512 and fixed member 530 at 540 and 542. Member 530 is fixed to channel member 544.

Figure 21A:
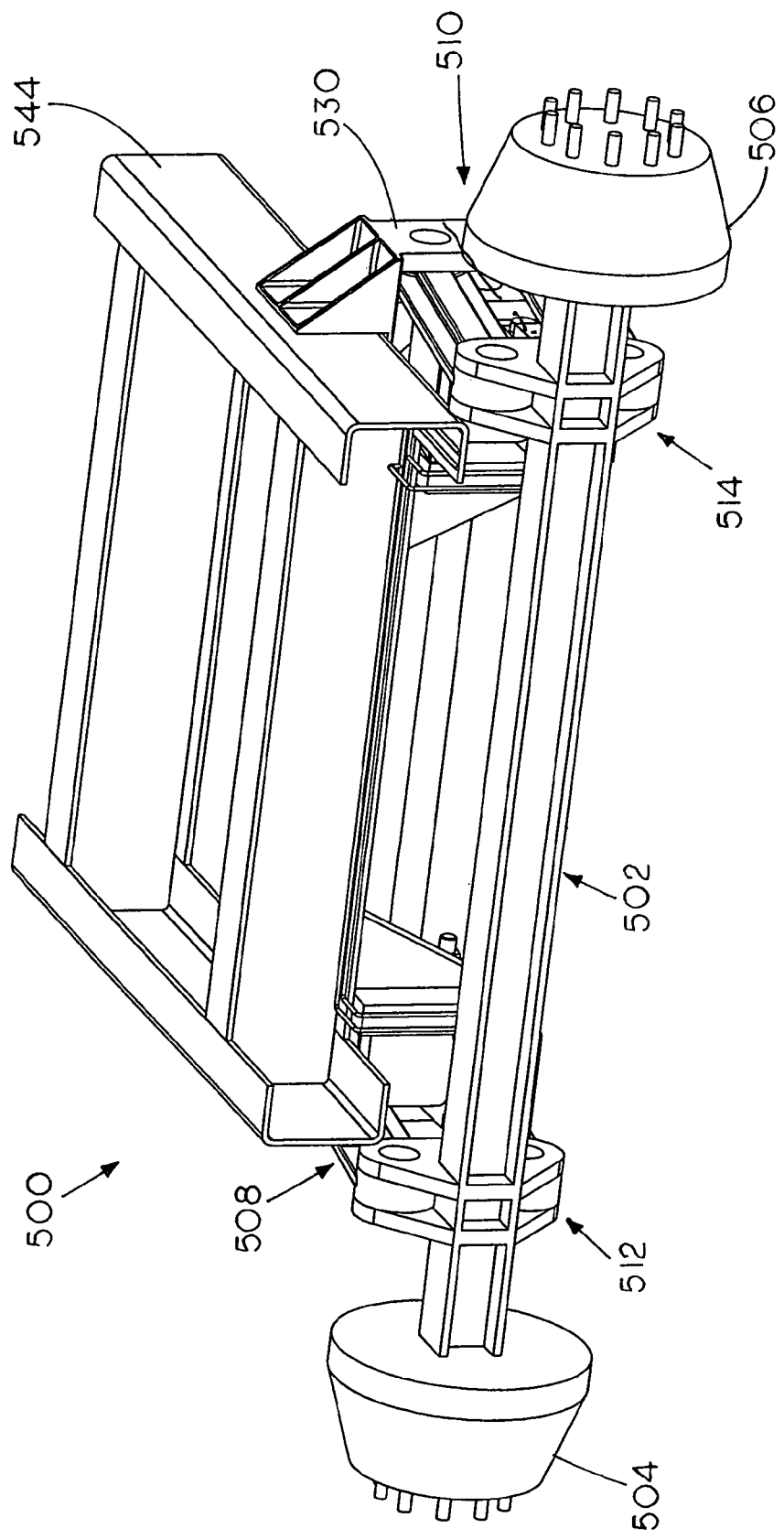
Figure 21C:
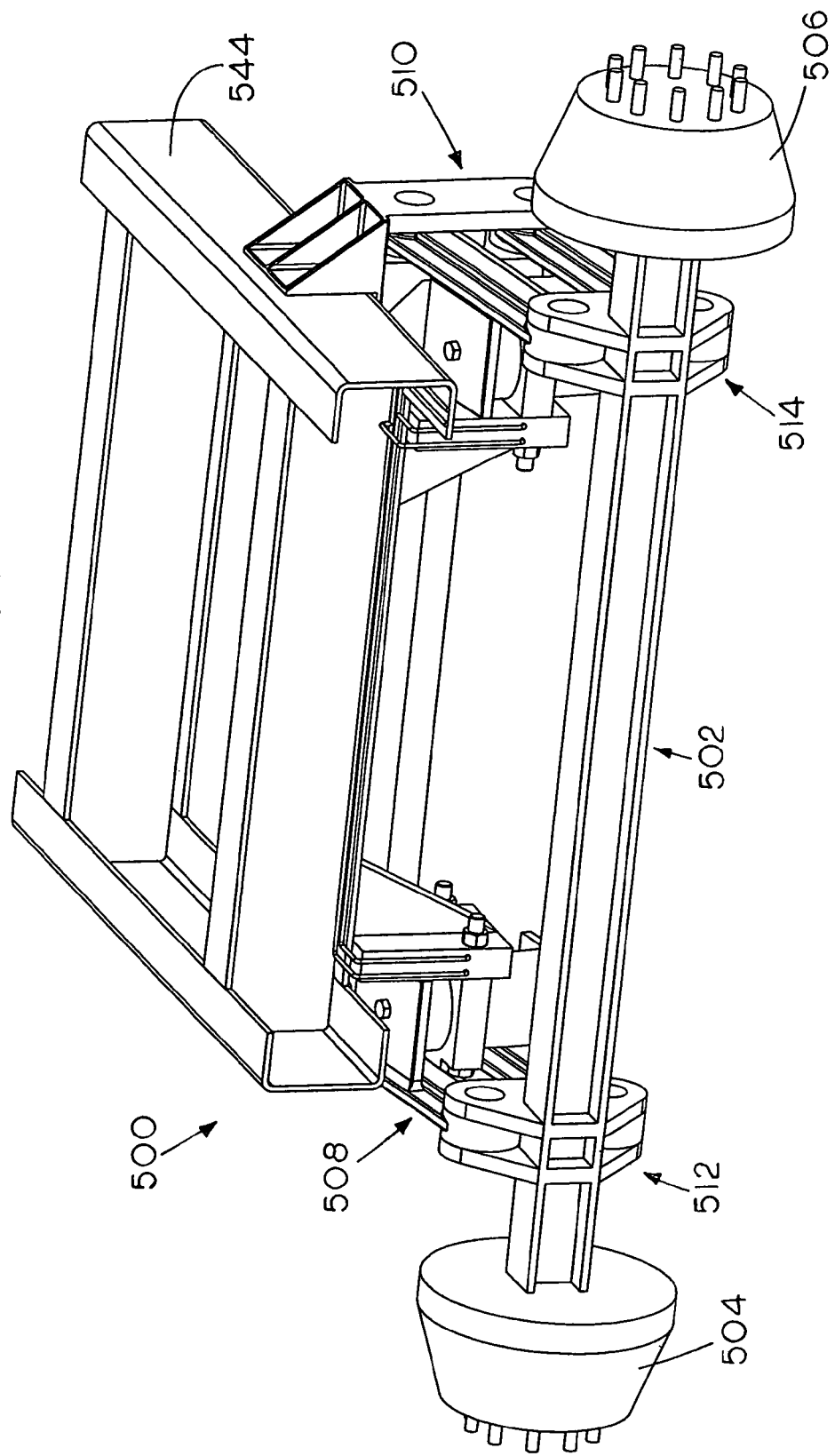
Figure 21D:
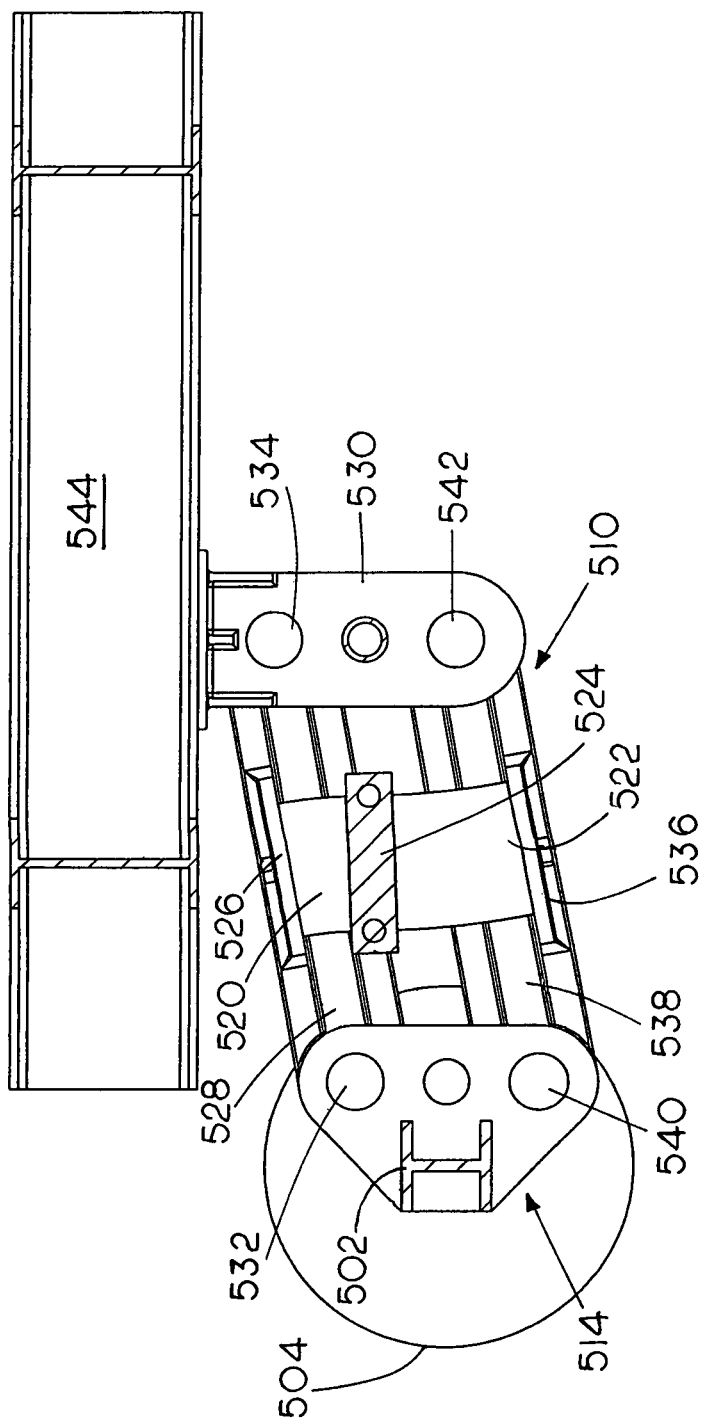

In this example of use. FIG. 21A depicts the axle assembly in a raised position with the upper airbag inflated 520 and the lower airbag 522 collapsed as shown in section B-B of FIG. 21B. Conversely, FIGS. 21C and 21D depict the axle assembly in a lowered position with the lower airbag 522 inflated and the upper airbag 520 collapsed. The central base 524 remains in a central position relative to member 530.

Of course, as with the previous arrangement, back-to-back airbags can be used to operate any of numerous possible connected devices.

This invention has been described herein in considerable detail in order to comply with the patent statutes and to provide those skilled in the art with the information needed to apply the novel principles and to construct and use embodiments of the example as required. However, it is to be understood that the invention can be carried out by specifically different devices and that various modifications can be accomplished without departing from the scope of the invention itself.

What is claimed is:

1. An airbag system comprising:
   (a) a mounting arrangement comprising a central base adapted to carry at least one airbag mounted thereon;
   (b) at least one airbag mounted on said central base each airbag having separate intake and exhaust ports; and
   (c) wherein said central base further comprises an internal control valve system adapted to separately control both the introduction of pressurizing air and exhausting of air to de-pressurize each of said at least one airbag.

2. An airbag system as in claim 1 wherein said internal control valve system further comprises at least one spool valve.

3. An airbag system as in claim 2 wherein the at least one spool valve is solenoid operated.

4. An airbag system as in claim 1 wherein said internal control valve system comprises a plurality of spool valves.

5. An airbag system as in claim 4 wherein the spool valves are solenoid operated.

6. An airbag system as in claim 1 further comprising a pressure sensor for sensing and transmitting a signal indicative of the air pressure in each of said at least one airbag.

7. An airbag system as in claim 6 wherein said signal from said pressure sensor is used to control the pressure in said at least one airbag using said control valve system.

8. An airbag system as in claim 1 further comprising an intake spool valve and an exhaust spool valve associated with each of said at least one airbag.

9. An airbag system as in claim 8 further comprising a pressure sensor for sensing and transmitting a signal indicative of the air pressure in each of said at least one airbag.

10. An airbag system as in claim 8 wherein the spool valves are solenoid operated.

11. An airbag system as in claim 1 comprising a pair of airbags mounted on opposite sides of said central base.

12. An airbag system as in claim 1 wherein said central base further comprises intake and exhaust ports associated with each of said one or more airbags.

13. A double-acting airbag system comprising:
   (a) a mounting arrangement comprising a central base adapted to carry at least one airbag mounted thereon;

(b) a pair of opposed airbags mounted on said central base; and (c) wherein said central base further comprises an internal control system for controlling air intake and exhaust for said airbags, said control system further comprising at least one spool valve associated with each of said pair of opposed airbags to supply air to and exhaust air from each of said pair of airbags.

14. An airbag system as in claim 13 wherein said internal control valve system further comprises two spool valves associated with each of said airbags.

15. An airbag system as in claim 13 wherein each spool valve is solenoid operated.

16. An airbag system as in claim 13 wherein said internal control system comprises a pressure sensor for sensing and transmitting a signal indicative of the air pressure in each airbag.

17. An airbag system as in claim 14 wherein the spool valves are solenoid operated.

18. An airbag system as in claim 14 wherein said internal control system comprises a pressure sensor for sensing and transmitting a signal indicative of the air pressure in each airbag.

19. An airbag system as in claim 18 wherein said signal from said pressure sensor is used to control the pressure in said at least one airbag using said control valve system.

\* \* \* \* \*